(12) United States Patent
Hosokawa et al.

(10) Patent No.: US 11,003,984 B2
(45) Date of Patent: May 11, 2021

(54) TIMING SEQUENCE FOR DIGITAL STDP SYNAPSE AND LIF NEURON-BASED NEUROMORPHIC SYSTEM

(71) Applicant: SAMSUNG ELECTRONICS CO., LTD., Suwon-si (KR)

(72) Inventors: Kohji Hosokawa, Shiga-ken (JP); Masatoshi Ishii, Shiga-ken (JP); Yutaka Nakamura, Kyoto (JP); Junka Okazawa, Kyoto (JP); Takeo Yasuda, Nara-ken (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 727 days.

(21) Appl. No.: 15/168,959

(22) Filed: May 31, 2016

(65) Prior Publication Data

US 2017/0344885 A1 Nov. 30, 2017

(51) Int. Cl.
*G06N 3/06* (2006.01)
*G06N 3/063* (2006.01)
*G06N 3/04* (2006.01)
*G06N 3/08* (2006.01)

(52) U.S. Cl.
CPC ............ *G06N 3/063* (2013.01); *G06N 3/049* (2013.01); *G06N 3/088* (2013.01)

(58) Field of Classification Search
CPC ................................ G06N 3/049; G06N 3/063
See application file for complete search history.

(56) References Cited

U.S. PATENT DOCUMENTS

| 5,278,945 | A | 1/1994 | Basehore et al. | |
|---|---|---|---|---|
| 5,333,239 | A * | 7/1994 | Watanabe | G06N 3/084 706/25 |
| 9,015,092 | B2 | 4/2015 | Sinyavskiy et al. | |
| 9,984,326 | B1 * | 5/2018 | Chen | G06K 9/62 |
| 10,055,434 | B2 | 8/2018 | Birdwell et al. | |
| 2007/0177466 | A1 * | 8/2007 | Ando | H04N 21/4147 369/13.01 |

(Continued)

OTHER PUBLICATIONS

Xin Jin, Implementing Spike-Timing-Dependent Plasticity on SpiNNaker Neuromorphic Hardware, Oct. 14, 2010, IEEE (Year: 2010).*

(Continued)

*Primary Examiner* — Li Wu Chang
(74) *Attorney, Agent, or Firm* — NSIP Law

(57) ABSTRACT

Methods and systems are provided for operating a neuromorphic system for generating neuron and synapse activities. The method includes: preparing at least one digital timer in the neuromorphic system, each of the at least one digital timers including multi-bit digital values; generating time signals using the at least one digital timer; emulating an analog waveform of a neuron spike; updating parameters of the neuromorphic system using the time signals and the current values of the parameters; presetting, using a processor, the digital values of the at least one digital timer to initial values when the spike input is provided to the node; and updating, using the processor, the digital values of the at least one digital timer with a specified amount when there is an absence of a spike input to the node.

20 Claims, 16 Drawing Sheets

(56) References Cited

U.S. PATENT DOCUMENTS

| | | | |
|---|---|---|---|
| 2012/0084241 A1* | 4/2012 | Friedman | G06N 3/049 706/27 |
| 2013/0073497 A1* | 3/2013 | Akopyan | G06N 3/049 706/27 |
| 2014/0012788 A1 | 1/2014 | Piekniewski | |
| 2014/0032458 A1 | 1/2014 | Sinyavskiy et al. | |
| 2014/0032465 A1 | 1/2014 | Modha | |
| 2014/0143193 A1 | 5/2014 | Zheng et al. | |
| 2014/0180985 A1 | 6/2014 | Alvarez-Icaza Rivera et al. | |
| 2014/0351190 A1 | 11/2014 | Levin et al. | |
| 2015/0046382 A1 | 2/2015 | Rangan | |
| 2015/0074026 A1 | 3/2015 | Szatmary et al. | |
| 2015/0106316 A1 | 4/2015 | Birdwell et al. | |
| 2016/0034812 A1 | 2/2016 | Gibson | |
| 2016/0086075 A1* | 3/2016 | Alvarez-Icaza Rivera | G06N 3/06 706/25 |

OTHER PUBLICATIONS

Runchun Wang, A neuromorphic implementation of multiple spike-timing synaptic plasticity rules for large-scale neural networks, May 20, 2015, frontiers in Neuroscience.*

Azghadi, M.R. et al., "Spike-Based Synaptic Plasticity in Silicon: Design, Implementation, Application, and Challenges," Proceedings of the IEEE, vol. 102, May 2014. (pp. 1-21).

Cassidy, A. et al., "A Combinational Digital Logic Approach to STDP," IEEE International Symposium of Circuits and Systems (ISCAS), May 2011. (pp. 1-4).

Cassidy, A. et al., "Design of Silicon Brains in the Nano-CMOS Era: Spiking Neurons, Learning Synapses and Neural Architecture Optimization," Neural Networks, vol. 45, Sep. 2013. (pp. 4-26).

Chu, M. et al., "Neuromorphic Hardware System for Visual Pattern Recognition With Memristor Array and CMOS Neuron," IEEE Transactions on Industrial Electronics, vol. 62, No. 4, Apr. 2015. (pp. 24102-2419).

Kim, Y. et al., "A Reconfigurable Digital Neuromorphic Processor with Memristive Synaptic Crossbar for Cognitive Computing," ACM Journal on Emerging Technologies in Computing Systems, vol. 11, No. 4, Article 38, Apr. 2015. (pp. 1-35).

Merolla, P.A. et al., "A million spiking-neuron integrated circuit with a scalable communication network and interface," Science, vol. 345, No. 6197, Aug. 2014. (pp. 668-673).

Schemmel, J. et al., "Implementing Synaptic Plasticity in a VLSI Spiking Neural Network Model," IEEE International Joint Conference on Neural Network Proceedings, Jul. 2006. (pp. 1-6).

Seo, J.S. et al., "A 45nm CMOS Neuromorphic Chip with a Scalable Architecture for Learning in Networks of Spiking Neurons," IEEE Custom Integrated Circuits Conference (CICC), Sep. 2011. (pp. 1-4).

Wu et al., "Energy-Efficient STDP-Based Learning Circuits with Memristor Synapses," Boise State University, May 2014. (pp. 1-8).

Jin, X. et al., "Implementing Spike-Timing-Dependent Plasticity on SpiNNaker Neuromorphic Hardware" IEEE (Oct. 2010) pp. 1-8.

Pfeil, T. et al., "Is a 4-bit synaptic weight resolution enough?—constraints on enabling spike-timing dependent plasticity in neuromorphic hardware" Frontiers in Neuroscience (Jul. 2012) pp. 1-19.

Kim, Y. et al., "A Digital Neuromorphic VLSI Architecture With Memristor Crossbar Synaptic Array for Machine Learning" IEEE International SOC Conference (Sep. 2012) pp. 328-333.

U.S. Office Action issued in U.S. Appl. No. 14/980,505, dated Feb. 11, 2019, pp. 1-53.

Frank, "An Accelerator for Neural Networks with Pulse-Coded Model Neurons", IEEE Transactions on Neural Networks, vol. 10, No. 3, May 1999, pp. 527-538.

Merolla, "A Digital Neuro-Synaptic Core Using Embedded Crossbar Memory with 45pJ per Spike in 45nm", IEEE Custom Integrated Circuit Conference, Sep. 2011, 4 pages.

U.S. Office Action issued in U.S. Appl. No. 14/980,295 dated May 31, 2019, 20 pages.

U.S. Office Action issued in U.S. Appl. No. 14/980,554 dated May 30, 2019, 20 pages.

Sangsu Park et al., "Electronic system with memristive synapses for pattern recognition", Scientific Reports, www.nature.com/scientifcreports, May 2015.

U.S. Office Action issued in U.S. Appl. No. 14/980,554 dated Aug. 20, 2019 (24 pages).

U.S. Office Action issued in U.S. Appl. No. 14/980,554, dated May 29, 2020, pp. 1-14.

* cited by examiner

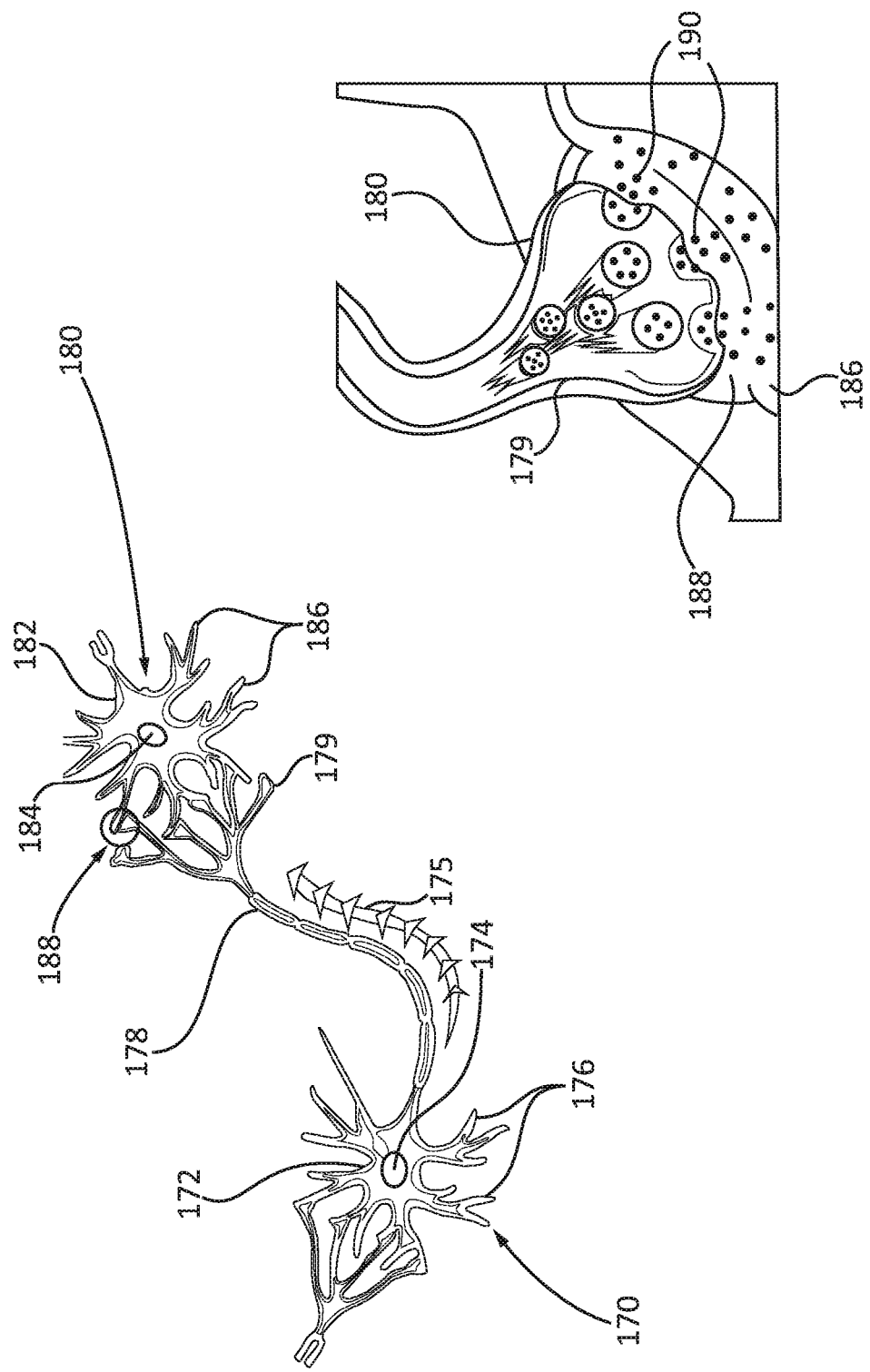

480

```
┌─────────────────────────────────────────────────────────┐
│ Parallel input system data are supplied as axon         │
│ spikes and supplied to AT, SWD, and SAG                 │
│ 482                                                     │
└─────────────────────────────────────────────────────────┘
                            ↓
┌─────────────────────────────────────────────────────────┐
│ Elapsed times since axon spikes occurring at            │
│ Corresponding synapses are timed and stored             │
│ 484                                                     │
└─────────────────────────────────────────────────────────┘
                            ↓
┌─────────────────────────────────────────────────────────┐
│ Elapsed times since dendrite spikes occurring at        │
│ corresponding synapses are timed and stored             │
│ 486                                                     │
└─────────────────────────────────────────────────────────┘
                            ↓
┌─────────────────────────────────────────────────────────┐
│ Current synapse weight values of the synapses are       │
│ obtained and stored                                     │
│ 488                                                     │
└─────────────────────────────────────────────────────────┘
                            ↓
┌─────────────────────────────────────────────────────────┐
│ Current neuron potentials of neurons are obtained and   │
│ stored                                                  │
│ 490                                                     │
└─────────────────────────────────────────────────────────┘
                            ↓
┌─────────────────────────────────────────────────────────┐
│ Neuron membrane potential values are updated based on   │
│ data stored in accordance with block activities 484,    │
│ 488, 490 using Leaky Integrate and Fire model of neuron │
│ membrane potential behavior                             │
│ 492                                                     │
└─────────────────────────────────────────────────────────┘
                            ↓
┌─────────────────────────────────────────────────────────┐
│ Synapse weight values of the synapses are updated based │
│ on data stored in accordance with block activities 484, │
│ 486, 488 using the Spike Time Dependent Plasticity Rule │
│ 494                                                     │
└─────────────────────────────────────────────────────────┘
                            ↓
┌─────────────────────────────────────────────────────────┐
│ Neuron firing of the dendrites is monitored by          │
│ comparing the neuron membrane potential with the neuron │
│ fire threshold value. The neuron membrane potential is  │
│ reset or preset to a certain value at neuron firing.    │
│ 496                                                     │
└─────────────────────────────────────────────────────────┘
                            ↓
┌─────────────────────────────────────────────────────────┐
│ Serial Neuron firing data is converted to parallel      │
│ data, and the parallel neuron firing data is sent to    │
│ the DT, SWI, SAG, and system output                     │
│ 498                                                     │
└─────────────────────────────────────────────────────────┘
```

FIG. 8

TIMING SEQUENCE FOR DIGITAL STDP SYNAPSE AND LIF NEURON-BASED NEUROMORPHIC SYSTEM

BACKGROUND

Technical Field

The present invention generally relates to neuromorphic systems and more particularly to timing sequences for neuromorphic systems that account for Spike Time Dependent Plasticity (STDP) synapse and Leaky Integrate and Fire (LIF) models of neuron activity.

Description of Related Art

Neuromorphic systems with Spike Time Dependent Plasticity (STDP) synapse and Leaky Integrate and Fire (LIF) neuron models may be simulated in software by describing the system in a mathematical model. However, the computing operation can take a long time in a software model, even when only a few synapses and neurons are modeled, for example, in a recognition of hand-written numbers.

SUMMARY

In accordance with an embodiment of the present principles, a method is provided for operating a neuromorphic system for generating neuron activity. The method includes the step of preparing at least one digital timer in the neuromorphic system, each of the at least one digital timers including multi-bit digital values. The method further includes the step of generating time signals using the at least one digital timer, the time signals showing a time that has elapsed since a spike input was provided to a node of a synapse in the neuromorphic system. The method further includes the step of updating parameters of the neuromorphic system using the time signals. The method further includes the step of presetting, using a processor, the digital values of the at least one digital timer to initial values when the spike input is provided to the node. The method further includes the step of updating, using the processor, the digital values of the at least one digital timer with a specified amount when there is an absence of a spike input to the node.

In accordance with another embodiment of the present principles, a system is provided. The system includes a memory. The system further includes at least one hardware-based one digital timer, each of the at least one digital timers including multi-bit digital values. The system further includes a hardware-based processor configured to generate time signals using the at least one digital timer, the time signals showing a time that has elapsed since a spike input was provided to a node of a synapse in the neuromorphic system, update, in the memory, parameters of the neuromorphic system using the time signals, preset the digital values of the digital timers to initial values when the spike input is provided to the node, and update the digital values of the digital timers with a specified amount when there is an absence of a spike input to the node.

In accordance with yet another embodiment of the present principles, a non-transitory computer-readable storage medium comprising a computer readable program for operating a neuromorphic system for generating neuron activity is provided. The computer readable program when executed on a computer causes the computer to perform the step of preparing at least one digital timer in the neuromorphic system, each of the at least one digital timers including multi-bit digital values. The computer readable program when executed on a computer causes the computer to further perform the step of generating time signals using the at least one digital timer, the time signals showing a time that has elapsed since a spike input was provided to a node of a synapse in the neuromorphic system. The computer readable program when executed on a computer causes the computer to further perform the step of updating parameters of the neuromorphic system using the time signals. The computer readable program when executed on a computer causes the computer to further perform the step of presetting, using a processor, the digital values of the at least one digital timer to initial values when the spike input is provided to the node. The computer readable program when executed on a computer causes the computer to further perform the step of updating, using the processor, the digital values of the at least one digital timer with a specified amount when there is an absence of a spike input to the node.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein:

FIG. 2 depicts biological nerve cells and in particular, a pre-synaptic neuron (pre-neuron) and a post-synaptic neuron (post-neuron) with an electrical signal transmitted across the axon of a pre-neuron and the synapse between the pre-neuron and post-neuron;

FIG. 3 depicts the circled area of FIG. 2 in additional detail, showing the synapse and the flow of neurotransmitters across the synapse;

FIG. 8 depicts an operation flow of a method of modeling spike time-dependent plasticity (STDP) and leaky integrate and fire (LIF) in a digital neuromorphic system in accordance with an embodiment of the present principles;

DETAILED DESCRIPTION

In accordance with present principles, the described digital neuromorphic system mimics behaviors of biological nerve cells through the accounting for Spike Time Dependent Plasticity (STDP) synapse behavior and Leaky Integrate and Fire (LIF) neuron activity. The aspects are implemented in system hardware to provide a system that can engage in on-system learning.

With STDP, repeated pre-synaptic neuron (pre-neuron) spike arrival a few milliseconds before post-synaptic neuron (post-neuron) action potentials leads in many synapse types to long-term potentiation (LTP) of the synapses, whereas repeated spike arrival after post-neuron spikes leads to long-term depression (LTD) of the same synapse. The change of the Synapse Weight (SW) plotted as a function of the relative timing of pre- and post-neuron action potentials is called the STDP function or learning window and varies between synapse types.

In the neuromorphic system according to present principles, each of the synapses of the network, which again are located between the axons of pre-neurons and the dendrites of post-neurons, has its own SW that is indicative of the strength of the connection between the axon and dendrite. Using the STDP model, SW is updated with timing between (1) an axon spike from a pre-neuron and (2) a dendrite spike from a post-neuron.

For on-system learning, the timing sequence greatly affects the performance of the neuromorphic system. This is due to the nature of a digital neuromorphic system. In a digital neuromorphic system, large parallel operations are converted into serial operations and several important parameters are time-dependent, e.g., the spike timing data at an axon and at a dendrite. In one embodiment, digital timers are introduced into the neuromorphic system to minimize errors in spike shape emulation. The digital Axon Timer (AT) and the digital Dendrite Timer (DT) are multi-bit digital timers and are able to emulate the shape of a neuron spike.

In one embodiment, the neuromorphic system is a hardware implementation in which the SWs are stored in a memory chip, e.g., in random access memory (RAM), in a digital circuitry which generates Neuron membrane Potentials (NPs) and SWs, modeling these effects with the LIF model of neuron and the STDP model of SW update.

According to present principles, implementation of the system in hardware improves the speed of operations by approximately by $10^3$ times or more. Hardware implementation enables significantly more learning cycles to be computable within a practical operation timeframe and on a real-time on-system learning, e.g., an on-chip for neuromorphic chip. Hardware implementation based on a digital system makes the operation stable and free of fluctuations of device characteristics.

Figure 1:
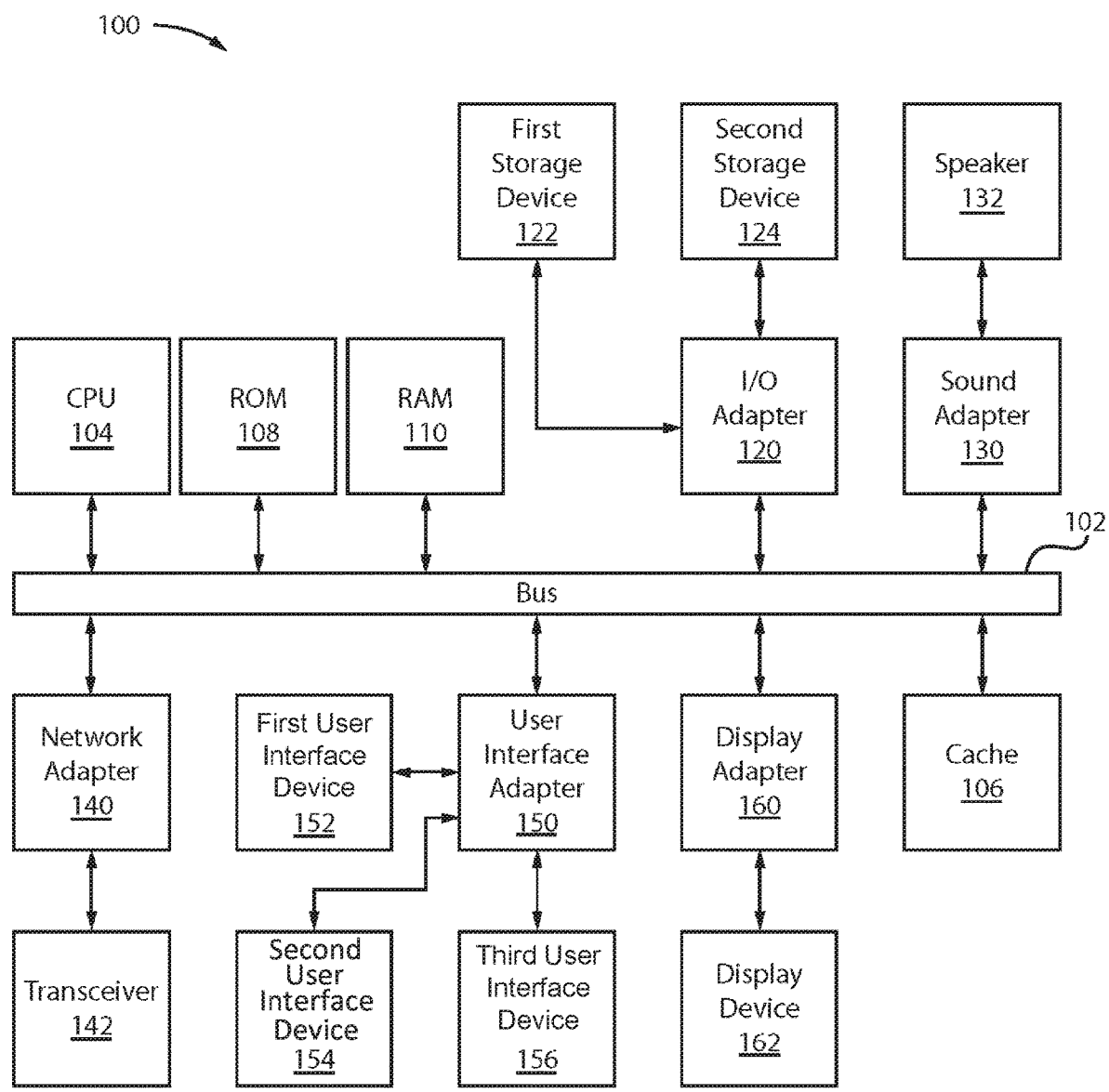
FIG. 1 an exemplary processing system to which the present principles may be applied.

Referring to FIG. 1, an exemplary processing system 100 to which the present principles may be applied is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160 are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user interface device 152, a second user interface device 154, and a third user interface device 156 are operatively coupled to system bus 102 by user interface adapter 150. The user interface devices 152, 154 and 156 can be any of a keyboard, a mouse, a keypad, an image capture device, a motion sensing device, a microphone, a device incorporating the functionality of at least two of the preceding devices, and so forth. Of course, other types of interface devices can also be used, while maintaining the spirit of the present principles. The user interface devices 152, 154, and 156 can be the same type of user interface device or different types of user interface devices. The user interface devices 152, 154, and 156 are used to input and output information to and from system 100.

The processing system 100 may also include other elements (not shown), as readily contemplated by one of skill in the art, as well as omit certain elements. For example, various other interface devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. It is to be appreciated that the terms processors and controllers can be used interchangeably herein. These and other variations of the processing system 100 are readily contemplated by one of ordinary skill in the art given the teachings of the present principles provided herein.

FIG. 2 depicts a biological neuron and synapse structure. Two neurons, a pre-neuron 170 and a post-neuron 180, are depicted with the following cell parts: pre-neuron cell body 172, nucleus 174, dendrites 176, axons 178, and axon tips 179 of pre-neuron 170; post-neuron cell body 182, nucleus 184, and dendrites 186 of the post-neuron 180. A synapse 188 is present between one of the axon tips 179 of the pre-neuron 170 and one of the dendrites 186 of the post-neuron 180.

The synapse is shown in detail in FIG. 3. Electrical signal 175 is transmitted along the axon 178, axon tips 179 of the pre-neuron 170. In response to a threshold action potential or graded electrical potential, neurotransmitters 190 are released at the axon tips 179 of the pre-neuron 170. The neurotransmitters 190 flow across the synapse 188 into dendrites 186 of the post-neuron 180.

Each synapse has a characteristic SW reflective of the strength of the connection. SW refers to the strength or amplitude of a connection between two nodes, corresponding in biology to the amount of influence the firing of one neuron has on another. According to present principles, SW is updated according to the period between an axon spike of a pre-neuron and the dendrite spike of a post-neuron in following the STDP synapse model.

Figure 4:
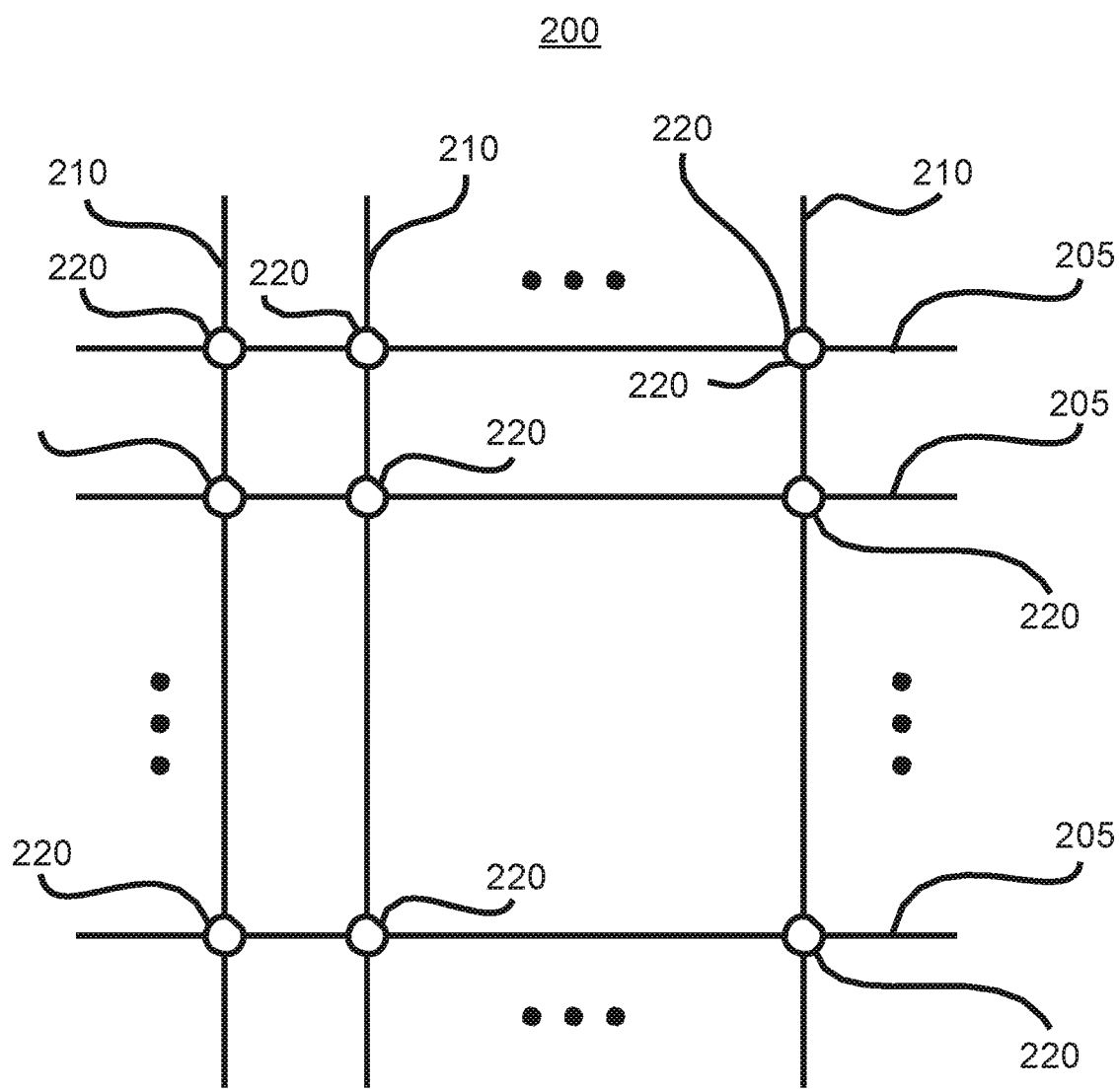
FIG. 4 depicts a crossbar structure of an artificial synapse network that can be employed in a system according to present principles, showing the axons, dendrites, and synapses formed by the network.

In a neuromorphic system modeled according to present principles, the synapses are arranged in a crossbar structure 200, as depicted in FIG. 4. The crossbar structure 200 comprises axon paths/wires 205 of pre-neurons and dendrite paths/wires 210 of post-neurons. The synapses 220 are located at cross-point junctions of each axon path 205 and each dendrite path 210. As such, each connection between one of the axon paths 205 and one of the dendrite paths 210 is made through one of the digital synapses 220.

The synapses 220 are aligned in an array, at the intersections of axon paths 205 of pre-neurons which extend horizontally, and the dendrite paths of post-neurons 210 which extend vertically. The synapses 220 are arranged as in the row and column lines of a memory array.

In this model, a post-neuron receives stimulus through a dendrite connected to a synapse, which raises the NP by a certain amount. On the other hand, leaky decay lowers the NP gradually. A modeling based on the LIF model accounts for this effect.

Figure 5:
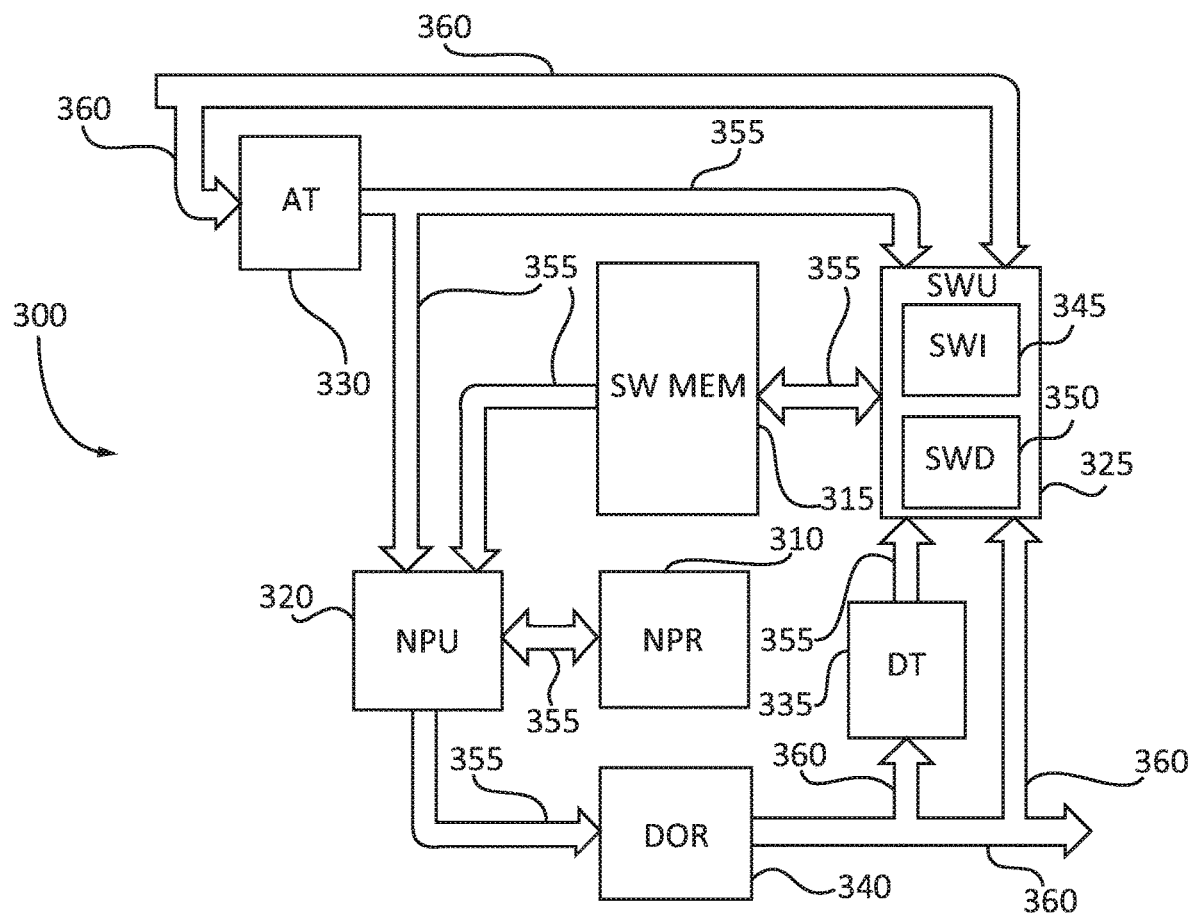
FIG. 5 depicts a block diagram of a digital neuromorphic system in accordance with present principles.

Referring to FIG. 5, a digital neuromorphic system 300 according to present principles is shown. The system is designed to digitally provide for STDP synapse and LIF neuron-based neuromorphic effects with on-system learning through a hardware configuration. In this system, internal signals are processed serially, with serial flow paths being designated 355. External signals are processed in parallel and are designated 360.

As shown, the system is configured to include a Neuron membrane Potential Register (NPR) 310 and Synapse Weight MEMory (SW MEM) 315. Neuron membrane Potential Update block (NPU) 320 updates the data of the NPR 310 with information provided by AT 330, SW MEM 315 and current data of the NPR 310. For this update, the data is transferred in serial manner. Synapse Weight Update block (SWU) 325 updates the data of the SW MEM 315 with information provided by the AT 330, DT 335 and current data of the SW MEM 315. For this update, the data is processed and transferred in a serial manner. An AT 330 and a DT 335 are provided to monitor the elapsed times since the occurrences of axon input spikes and a dendrite output spikes, respectively. In an embodiment of the present principles, the AT 330 and the DT 335 perform as digital timers. External signals are provided in parallel to the AT 330, while its output processed in serial. A parallel signal from a Dendrite Output Register (DOR) 340 arrives at the DT 335. Output signals from the DT 335 are processed in serial. The DOR 340 converts the internal serial data 355 into the external parallel data 360.

In one embodiment of the present principles, the digital timers in the AT 330 and the DT 335 are multi-bit digital timers and emulate the shape of a neuron spike. The values of these digital timers represent the duration of time that has elapsed since spikes were given to both nodes of a synapse. According to the STDP rule, the values of the digital timers are used to update parameters of the neuromorphic system 300. These parameters include, e.g., SW and NP.

In one embodiment of the present principles, values of the digital timers in the AT 330 and the DT 335 are preset to initial (or maximum) values when an axon spike and a dendrite spike are given, respectively. Otherwise (i.e., with there are no axon spikes or dendrite spikes), the values of the digital timers are updated (decreased) by a certain amount. This update of the digital timers in the AT 330 and the DT 335 is performed once for each timer in every evaluation cycle.

In one embodiment of the present principles, at least two simultaneous operations performed by the neuromorphic system are separated into multiple independent operation steps, such as, e.g., a SW decrement step, a NP update step, a SW increment step, etc., in order to avoid any parameter update conflicts. During the operation of each of these steps, only a target parameter update is performed, and update operations for other parameters are not processed. The NPR 310 stores the NP. The NPR 310 can be included in a digital processor, such as the central processing unit (CPU) of a computing device. In one embodiment, a register is employed for the NPR 310 in neuromorphic system with a large number of neurons. In another embodiment, where the system has a small number of neurons, a memory element such as latch or flip flop can be employed for the NPR 310.

The SW MEM 315 stores the SW. Any kind of rewritable memory, without regard to whether it is volatile or non-volatile memory, can be employed in the SW MEM 315. In one embodiment, memory with both row only access and column only access may be employed.

The NPU 320 updates NP values, employing the elapsed time information from the AT 330, SW values from the SW MEM 315, and the current NP values from the NPR 310. The NPU 320 also determines whether the NP reaches a certain threshold value in order to generate a neuron fire signal. Since NPs exhibit leaky decay as a result of the "calm down" of a neuron, the NPU 320 makes updates of the NP values based on the LIF model. A write operation is preformed to update the NP values in NPR 310, e.g., updated NP values determined in the NPU 320 are written to the NPR 310.

The SWU 325 updates the SW values with the elapsed time information provided by the AT 330 and the DT 335 together with the current SW values obtained from the SW MEM 315. The elapsed time represents the time between an axon input spike and a dendrite output spike. SW values in the SW MEM 315 are updated in a write operation. The update values are determined by the SWU 325.

The SWU 325 includes two independent blocks, which are shown as a synapse weight increment block (SWI) 345 and a synapse weight decrement block (SWD) 350. The SWU 325 runs an algorithm based on the STDP rule. The SWU 325, the SWI 345, and the SWD 350 implement STDP-based on-system learning.

In an exemplary STDP protocol, the SW is updated (modified) by receiving a neuron fire spike of a pre-neuron (an input spike) at an axon node shortly before or shortly after receiving a neuron fire spike of a post-neuron (an output spike) at a dendrite node. For example, injecting at least two spike pulses to the nodes of the synapse within a certain short period will cause a change in SW, e.g., a SW update event. In a real biological neural network, the neuron fire event occurs once in several milliseconds asynchronously and concurrently in parallel for all neurons. The SW update occurs not so rapidly in response to these neuron fire events (event driven base). In the proposed neuromorphic system 300, however, the NP and the SW updates are processed serially. The detailed update scheme and amount of the SW may be implemented inside the SWI 345 and SWD 350, in consideration of the device performance measurement or simulation results. The update amount (change in SW) can be plotted as a function of the relative arrival time difference of a pre-neuron fire spike and a post-neuron fire spike.

The AT 330 includes the timers for all axons in the system. The AT 330 measures the elapsed time since axon input signals have been received from outside of the system. The DT 335 includes the timers for all dendrites in the system. The DT 335 measures the elapsed time since dendrite output signals, e.g., neuron fire signals, generated by the NPU 320 for the post-neuron.

The DOR 340 provides serial to parallel conversion of dendrite output, e.g., neuron fire signals. Whereas internal signals are processed serially, the external interface is in a parallel arrangement.

The above-described system components allow for quick verification and the debugging of complicated STDP-based on-system learning and LIF neuron functions prior to manufacturing system-based hardware in silicon. For example, the system can be entirely simulated in hardware. Also, hardware can be implemented with reconfigurable logic circuits, for example field-programmable gate arrays (FPGAs).

Figure 6:
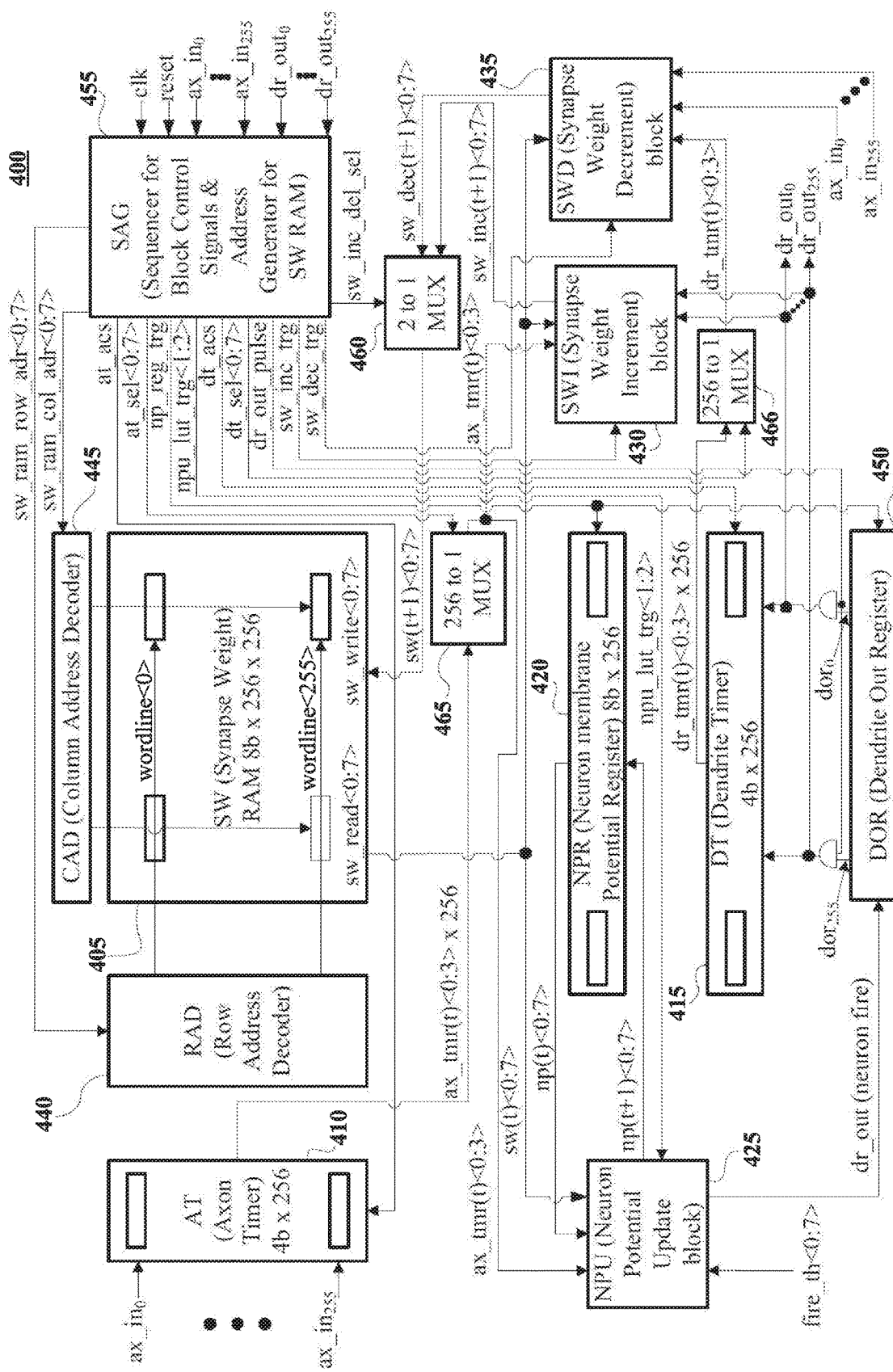
FIG. 6 depicts a detailed block diagram of a digital neuromorphic system in accordance with the present principles.

FIG. 6 shows a block diagram of a neuromorphic system 400 according to present principles. In one embodiment, the neuromorphic system 400 implements the crossbar structure 200 for synapses as shown in FIG. 4. The crossbar structure is implemented in Synapse Weight RAM (SW RAM) 405. SW RAM 405 can be any type of RAM, for example SRAM, DRAM or NVRAM etc. In one embodiment, there are 256 neurons and 256×256=65536 synapses. This number can be modified in accordance with the specifications of the target application.

The SW data for the synapses are stored in the SW RAM 405. For example, the SW data can be stored in eight (8) bit length each. The rows and columns of the SW RAM 405 correspond to axons of pre-neurons and dendrites of post-neurons, respectively. By way of example, SW RAM (i, j) 405 respectively represents the SW of a synapse between axon i and neuron body j (or dendrite j).

Spike timing is one of the parameters accounted for in STDP model. The AT 410 and the DT 415 respectively determine the elapsed time since a spike appears in the axon and in the dendrite nodes of the synapses. These data are independently stored in 4 bit for the (256) axons and the (256) dendrites. The spike time data are read out and utilized one by one sequentially as instructed by the Sequencer for block control signals and Address Generator for the synapse weight RAM (SAG) unit 455. For the AT 410 and the DT 415 to determine elapsed times, data is accessed by an AT access signal (at_acs) and a DT access signal (dt_acs) generated by the SAG 455. The timing data is stored in 4 bit lengths for all axons and dendrites, but bit lengths can be selected based on the application of the system. In order to select one AT and one DT data out of 256 AT data and 256 DT data, respectively at a given time, the 8-bit select signals at_sel<0:7> and dt_sel<0:7> are, for example, incremented from 0 to 255 according to the operation state. Axon input spike signals $ax\_in_i$ (i=0 to 255) are provided to the AT 410 and SAG 455 as an external system signal that is processed in parallel. In an embodiment of the present principles, the AT 410 and the DT 415 are digital timers.

The Neuron membrane Potential Register (NPR) 420 stores the NP for each neuron and shows the status of the neuron as digital quantized value. In an excitatory neuron, the NP increases every time the neuron receives a spike, e.g., a stimulus from axons, e.g., the axons $ax\_in_i$ (for i=0 to 255), through connected synapses 220, as shown in FIG. 4. The neurons are stimulated through synapses and their NPs are raised until the NPs reach a certain level that is also called the fire threshold level. The signal fire_th<0:7> gives the fire threshold level of the neurons which is given from outside of the system as one of the operation parameters. With an inhibitory neuron, the NP decreases when the neuron receives a spike and it can be implemented in the same way, except that the behavior of the NP is in the opposite direction. For present discussion purposes, only the excitatory neurons are considered.

The NP is read out from the NPR 420 and updated in the Neuron membrane Potential Update block (NPU) 425. The updated value is written back into the NPR 420. The updated amount of the NP is determined by the corresponding AT 410 value and the corresponding SW amount. Thus the greater the AT 410 value or the SW value are, the greater the NP is increased. This process is repeated in implementing the integration function of the NP value. Once the NP reaches the threshold level, the NP is reset (or preset) to its initialization level. If the NP value should be initialized to a certain level (yet avoiding GND or zero potential level) as a result of timing, the user can specify the preset level by way of an instruction given from outside of the system. The timing values obtained from the AT 410 and SW values for the corresponding synapses are used by the NPU 425 to determine the incremental change in the NP. The NPU 425 implements this operation while accounting for the leaky decay of the NP by implementing the LIF model. Of note, the leaky decay effect of the LIF model is implemented inside the NPU 425 after the integration operation, with data concerning AT 410 values, SW values, and current NP values.

In implementing the LIF function, the NPU 425 receives the current AT 410 value, ax_tmr(t)<0:3>, from the AT 410, the current SW value, sw(t)<0:7>, from the SW RAM 405, and the current NP value, np(t)<0:7>, from the NPR 420. The access control and trigger signals at_acs, at_sel<0:7>, sw_ram_row_adr<0:7>, sw_ram_col_adr<0:7> and np_reg_trg as well as npu_lut_trg<1:2> are generated by the SAG 455 to supply input signals for the NPU 425. The NPU 425 includes the leaky decay effect and generates a next NP value as output data.

The NPR 420 is updated with updated NP value, (np(t+1)<0:7>), generated by the NPU 425. The sequence and data flow is controlled by the SAG 455.

The STDP model uses spike timing information for the SW update operation. STDP is a temporally asymmetric form of Hebbian learning induced by tight temporal correlations between the spikes of pre- and post-neurons. As with other forms of synaptic plasticity, it is widely believed that it underlies learning and information storage in the brain, as well as the development and refinement of neural circuits during brain development.

The SWI 430 and the SWD 435 respectively perform increments and decrements in SW values. The amount of change in SW value, e.g., the amount of increment or the amount of decrement in SW value, is determined with the current 256 AT values obtained from the AT 410, (ax_tmr (t)<0:3>), current 256 DT values obtained from the DT 415, (dr_tmr(t)<0:3>), and the current SW values obtained from the SW RAM 405, (sw_read<0:7>). The SW update is triggered by any one of axon input spike signals $ax\_in_i$ (for i=0 to 255) or any one of dendrite output spike signals $dr\_out_j$ (for j=0 to 255). For example, if one axon input spike occurs on ax_in$_i$, a SW decrement calculation is performed for the synapse only in row "i" (SW$_{ij}$; for j=0 to 255). A 256 to 1 multiplexor (MUX) 466 selects one of the DT values, dr_tmr(t)<0:3>, out of the 256 DT values (dr_tmr(t)<0:3>×256) for dendrite$_0$ to dendrite$_{255}$ (or for neuron$_0$ to neuron$_{255}$). The selection changes with the dt_sel<0:7> signals from dendrite$_0$ to dendrite$_{255}$ (or from neuron$_0$ to neuron$_{255}$) for sequential process in SWD 435. On the other hand, if there is one dendrite output spike only on dr_out$_j$ a SW increment calculation is performed for the synapses in column "j" (SW$_{ij}$; for i=0 to 255). A 256 to 1 multiplexor (MUX) 465 selects one of the AT values, ax_tmr(t)<0:3> out of 256 AT values (ax_tmr(t)<0:3>×256) for axon$_0$ to axon$_{255}$. The selection changes with the at_sel<0:7> signals from axon$_0$ to axon$_{255}$ for sequential process in the SWI 430. Output values from the SWI 430 (sw_inc(t+1)<0:7>) and from the SWD 435 (sw_dec(t+1)<0:7>) are triggered by signals sw_inc_trg and sw_dec_trg, respectively. These trigger signals are generated by the SAG 455. The values are processed by a 2 to 1 multiplexor (MUX) 460, selecting either the sw_inc(t+1)<0:7> value or sw_dec(t+1)<0:7> value as an updated SW value, sw(t+1)<0:7>, to synapse write port (sw_write<0:7>) in 8 bit. Thus updated SW value is written to the SW RAM 405.

Row Address Decoder (RAD) 440 and Column Address Decoder (CAD) 445 decode row and column addresses of the SW RAM 405 (sw_ram_row_adr<0:7> and sw_ram_col_adr<0:7>, respectively). The addresses, generated by SAG 455, are used for read and write access to the SW RAM 405. The read access is performed to obtain current SW value sw(t)<0:7> from the read data output port sw_read<0:7>. For write access, the updated SW value sw(t+1)<0:7> is given to the write data input ports, sw_write<0:7>, replacing the current value sw(t)<0:7> in write access. As indicated, the timing of the sequences for these operations is generated by SAG 455.

Figure 7A:
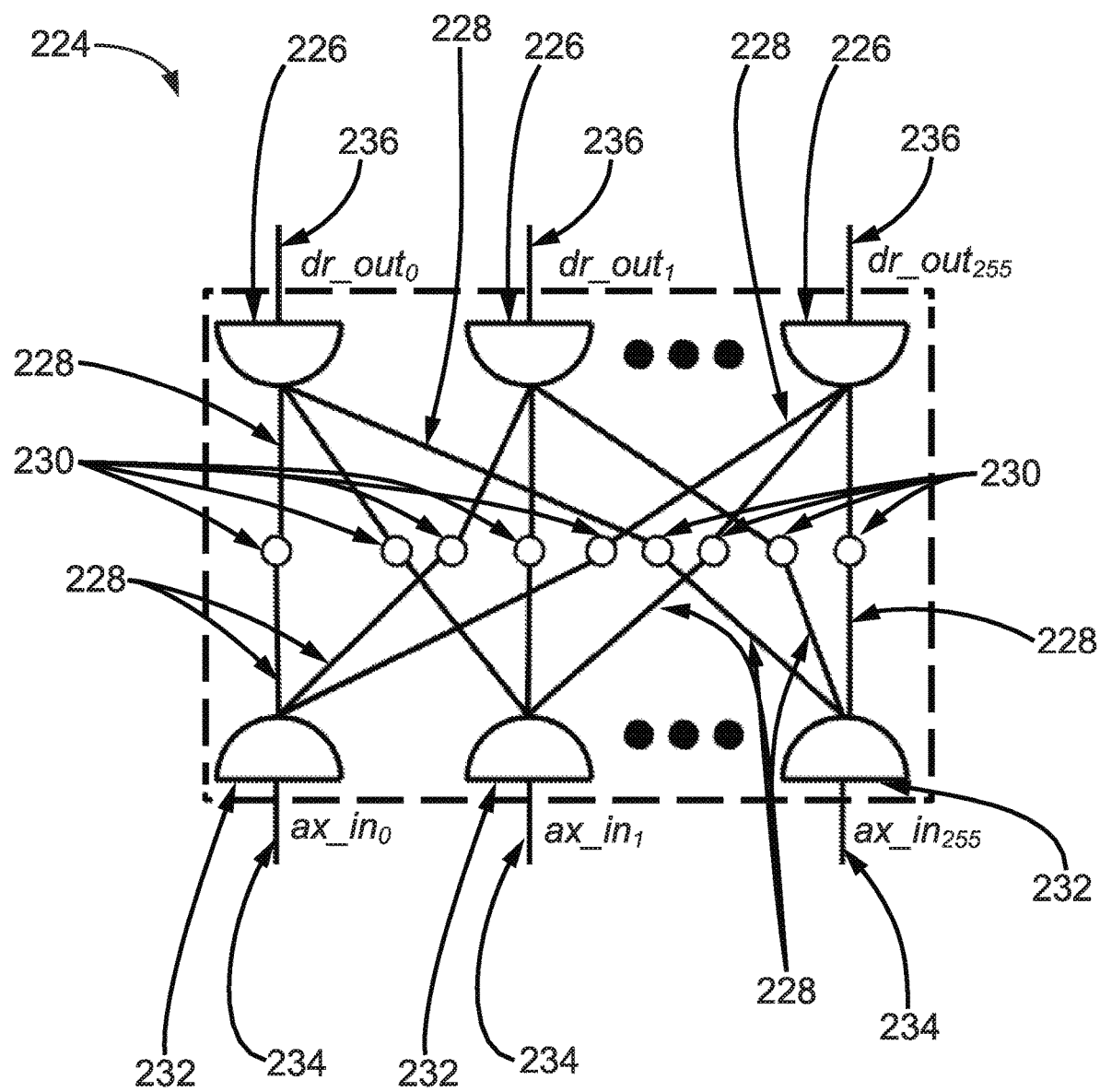
FIG. 7A depicts a single-core system without feedback connection that can be implemented with the neuromorphic system of FIG. 6.

The neuromorphic system 400 in FIG. 6 can be defined as a neuromorphic system core. Referring to FIG. 7A, depicted is a single-core system 224 with system core 400 without feedback connection. The axon input signals ax_in$_i$ (for i=0 to 255), denoted 234, are the input signals supplied from outside the system in a single-core system without feedback connection. As shown, the single-core system 224 includes axon drivers of pre-neurons 232, neuron bodies with dendrite drivers of post-neurons 226, and synapses 230 in operative communication with same through connectors 228. In this arrangement, the dendrite output signals dr_out$_j$ (for j=0 to 255), denoted 236, are the system external output signals, e.g., signals that are supplied outside of the system 224.

Figure 7B:
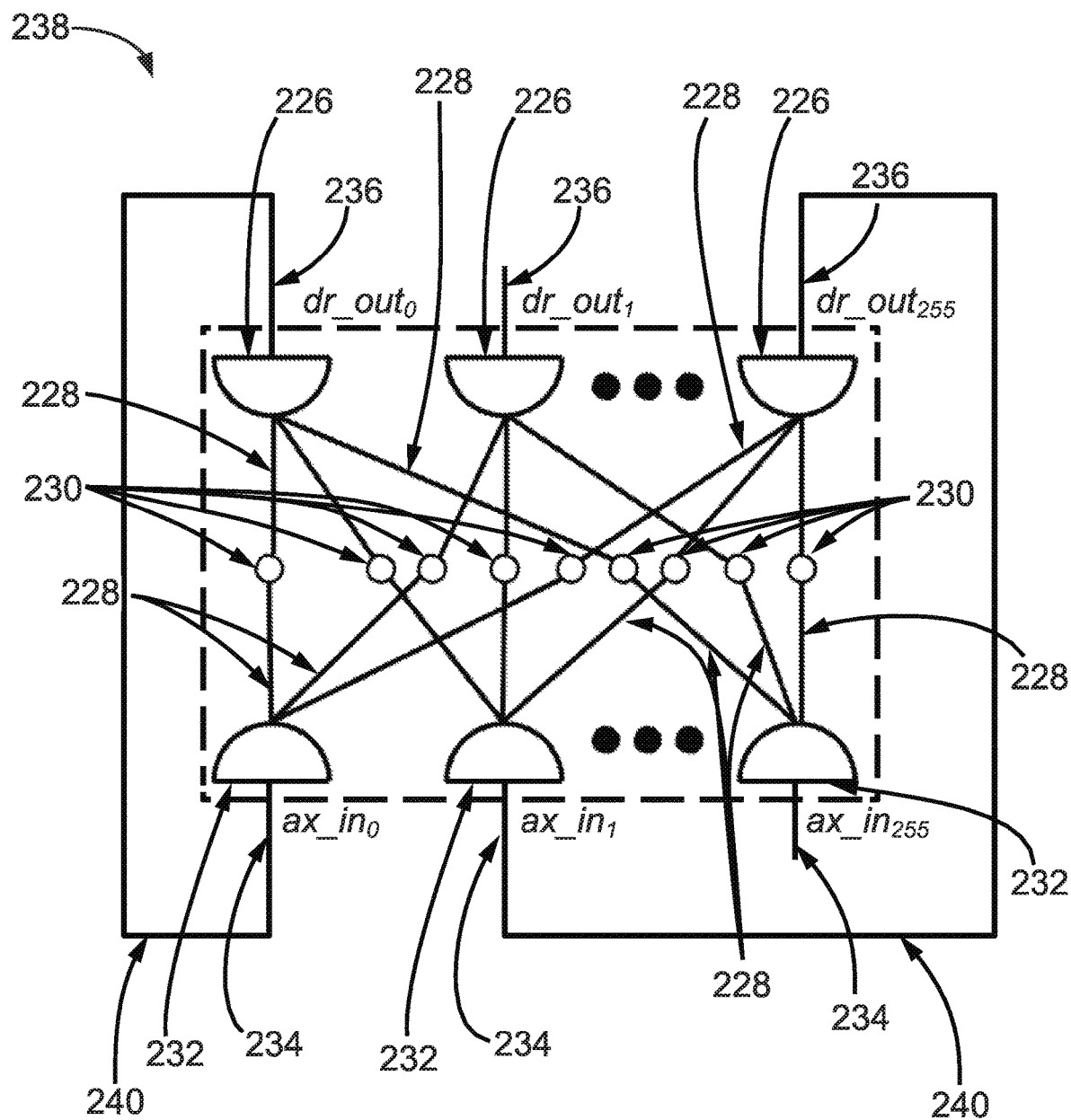
FIG. 7B depicts a single-core system with feedback connections that can be implemented with the neuromorphic system of FIG. 6.

Referring to FIG. 7B, shown is a single-core system 238 with the system core 400 with feedback connections. As for the single-core system with feedback connections, one or more ax_in$_i$ signals, e.g., denoted 234, are connected with some numbers of dr_out$_j$ signals 236 with feedback connections 240. The feedback connections 240 create internal system signals between ax_in$_i$ signals 234 and dr_out$_j$ signals 236.

Figure 7C:
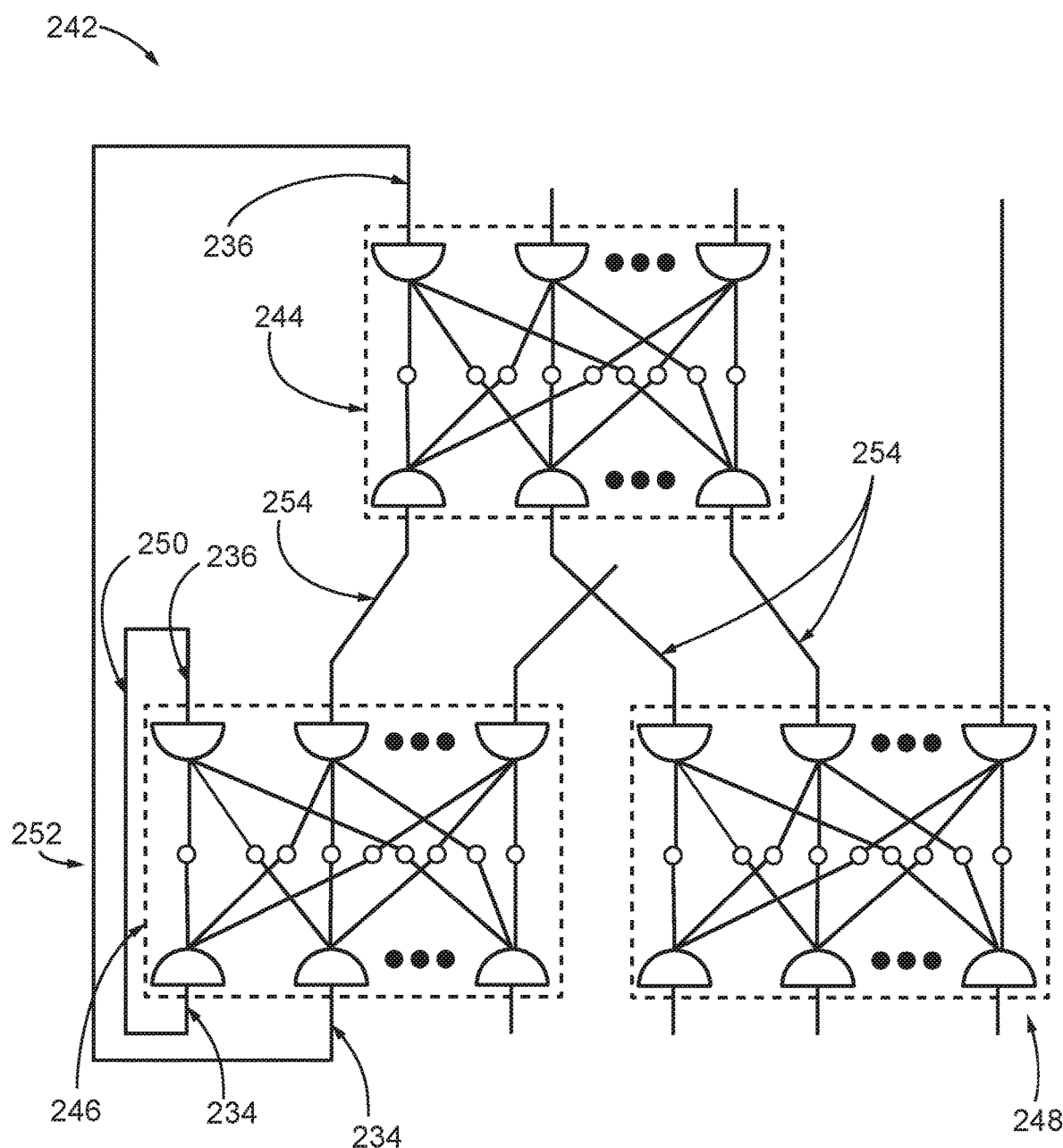
FIG. 7C depicts a multi-core system that can be implemented with the neuromorphic system of FIG. 6.

Referring to FIG. 7C, depicted is a multi-core system 242 that can be implemented with the neuromorphic system core 400 in FIG. 6. The multicore system 242 consists of three (3) system cores, denoted 244, 246, and 248, configured internally in the same manner as systems 224 and 238 described above, so that numbering of like parts is omitted here. With system core 246, shown is an internal feedback connection 250 between an ax_in$_i$ and a dr_out$_j$ of the same system core. Furthermore, a dendrite output (dr_out$_j$) of the system core 246 is connected to an ax_in$_i$ of the system core 244 via connector 254. System core 248 is also connected to the system core 244 via some dr_out$_j$ to the same number of ax_in$_i$ by connectors 254. Still further, a dr_out$_j$ of the system core 244 is connected to an ax_in$_i$ of the system core 246 by a connector 252. These arrangements provide for transferring signals internally, system core-to-system core.

Inside a core, the post-neuron output signals dr_out$_j$ (for j=0 to 255) are generated as the "neuron fire" signals (e.g., dr_out (neuron fire)). Referring to FIG. 6, the neuron fire signals are forwarded from NPU 425 and sent to the dendrite output register (DOR) 450. The "neuron fire" signals of post-neurons may be fed back to the synapse array in the same core and transferred to external system output. For the system with feedback connection or multi-core system, the connections between the dendrite output (dr_out$_j$) and the axon input (ax_in$_i$) are determined by the system user or designer. According to these connections, the system can be single-core system with or without feedback connections or a multi-core system with or without feedback connections. For a single-core system, the self-connections can be implemented as feedback connections. If the core has two modes, that is, a learning mode and non-learning mode. For the implementation of the STDP modeling, the fire signals of the post-neurons are supplied to the dendrites of the corresponding synapses in the learning mode. That is, in the learning mode, the SW values of synapses connecting to the fired neuron are targets for update (increment or decrement).

The DOR 450 converts the serial dr_out (neuron fire) signal to parallel signals dor$_j$ (for j=0 to 255) to provide parallel input to the synapse and core output dr_out$_j$ (for j=0 to 255). These core output signals are system external output for single-core system without a feedback connection. For other cases, one or some of these output signals are connected to ax_in$_i$ (for i=0 to 255) of other core or itself. In this way the system with a feedback connection or the multi-core system can be implemented by appropriate connections between dr_out$_j$ of one core to ax_in$_i$ of the same, or another, core.

According to present principles, the system described herein provides a design platform of a neuromorphic system for STDP synapse and LIF neuron based neuromorphic system. The system, which employs several function blocks as described (e.g., SW RAM 405, AT 410, DT 415, NPR 420, NPU 425, SWI 430, SWD 435, RAD 440, CAD 445, DOR 450 and SAG 455) is implemented in hardware, which provides for faster design speeds and more efficient uses of system resources. The function of all of the function blocks and the various interfaces between the blocks are also described. The circuitry of the blocks can be freely implemented by the system designer freely and easily. Further by making this structure as a neuromorphic function unit core, multi-core system as well as single-core system with or without feedback paths can be implemented effectively with the simple definition of external connections.

Referring now to FIG. 8, a method 480 for generating a neuron activity neuromorphic system with STDP modeling and LIF modeling, in accordance with an embodiment of the present principles, will now be described. The method can be practiced through a hardware implementation.

In block 482, neuron activity and synapse activity are generated between neurons in a network. e.g., the crossbar network of axons, dendrites and synapses as depicted in crossbar network 200 of FIG. 4. In one embodiment, the crossbar network is embodied in a random access memory. In one embodiment employing the afore-described system in accordance with present principles, the system input is sent to the AT 410, the SWD 435 and the SAG 455. In one embodiment, the input is sent singularly to a single core network or in parallel to a multicore network.

In block 484, the elapsed times since axon spikes occur at corresponding synapses are timed and stored. As indicated, an AT 410 may be used to measure time that has elapsed since the occurrence of an axon spike.

In block 486, the elapsed times since dendrite spikes occur at corresponding synapses are timed and stored. As indicated, a DT 415 may be used to measure time that has elapsed since the occurrence of a dendrite spike.

In block 488, the current SW values of the synapses are obtained and stored, for example, in an SW RAM 405.

In block 490, the current NPs of neurons is obtained and stored, for example, in a NPR 420.

In block 492, the NP values are updated based on data stored in accordance with the above-mentioned block activities, namely storing the elapsed time since the occurrence of axon spikes in block 484, storing the current SW values of the synapses in accordance with block 488, and storing the current NP of the neurons in accordance with block 490. The update of NP values is determined using the LIF model of NP behavior.

In block 494, the SW values of the synapses are updated based on data stored in accordance with the above-mentioned block activities, namely storing the elapsed times since the occurrence of axon spikes in block 484, storing the elapsed times since the occurrence of dendrite spikes in block 486, and storing the current SW values of the synapses in block 488, the update of SW values being based on the STDP rule.

In block 496, neuron firing of the dendrites is monitored by comparing the NP with the neuron fire threshold value. The NP is reset or preset to a certain value at the neuron firing.

In block 498, serial neuron firing data is converted to parallel data, and the parallel neuron firing data is sent to the DT 415, SWI 430, SAG 455 and system output.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
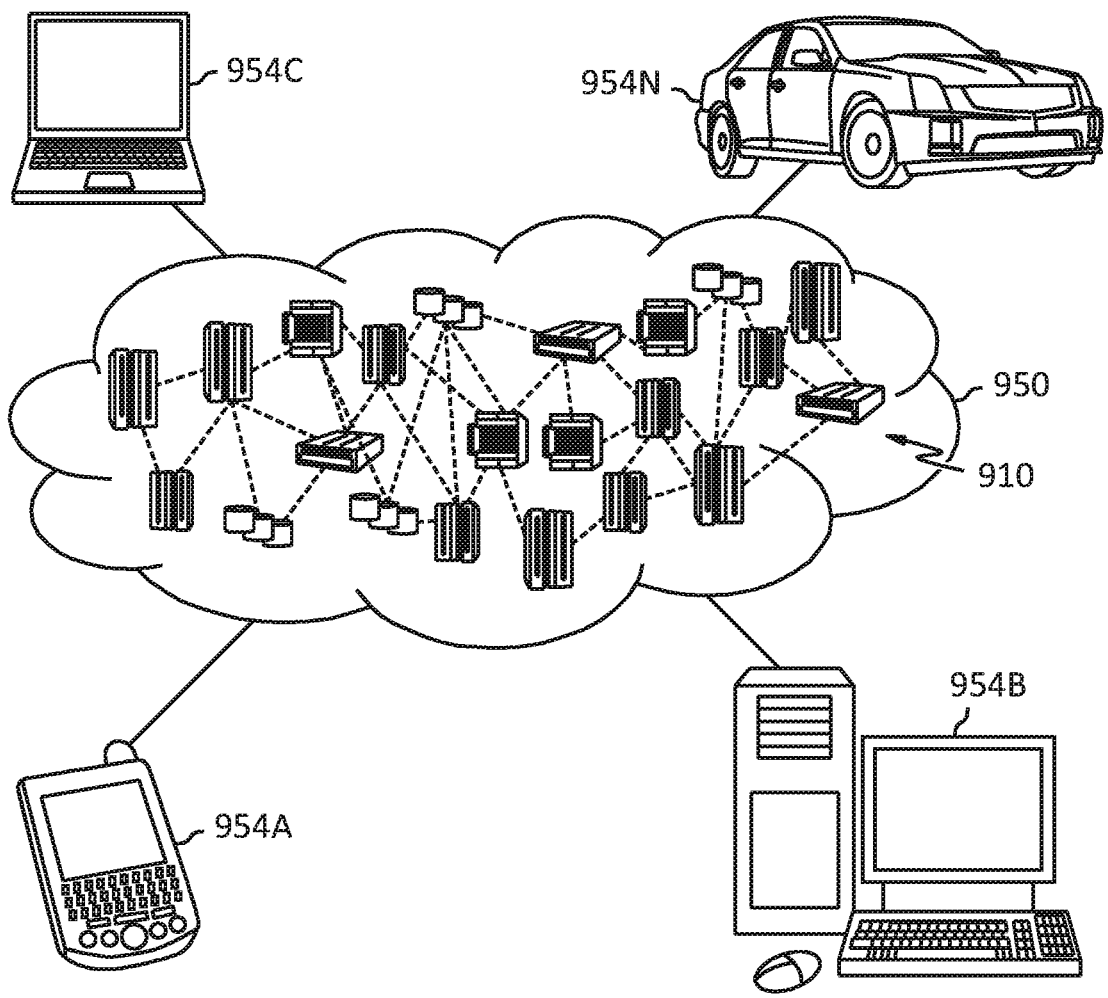
FIG. 9 depicts a cloud computing environment according to an embodiment of the present principles.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
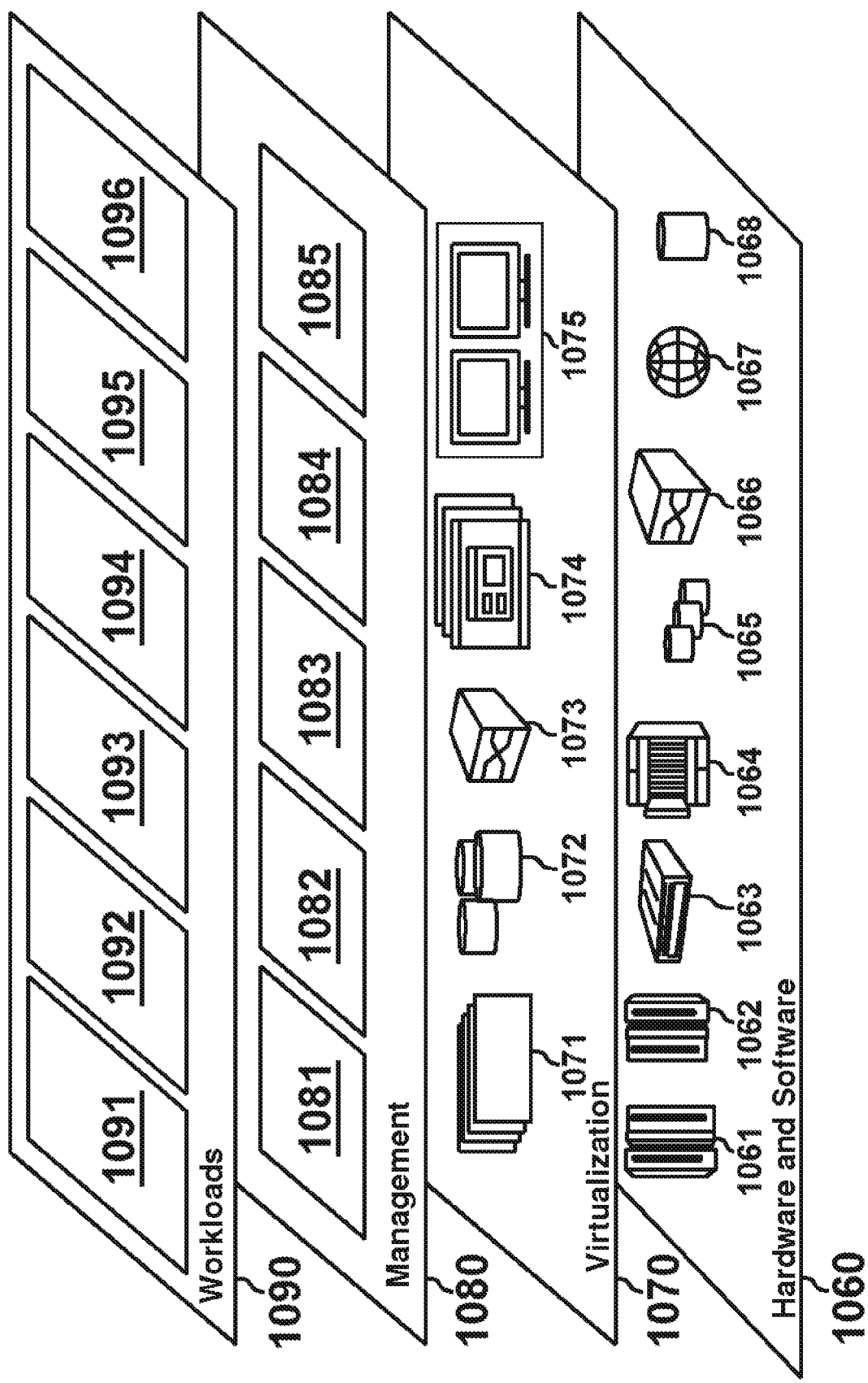
FIG. 10 depicts abstraction model layers according to an embodiment of the present principles.

Referring now to FIG. 10, a set of functional abstraction layers provided by cloud computing environment 1050 (FIG. 1) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 94; transaction processing 1095; and neuromorphic systems 1096.

Figure 11:
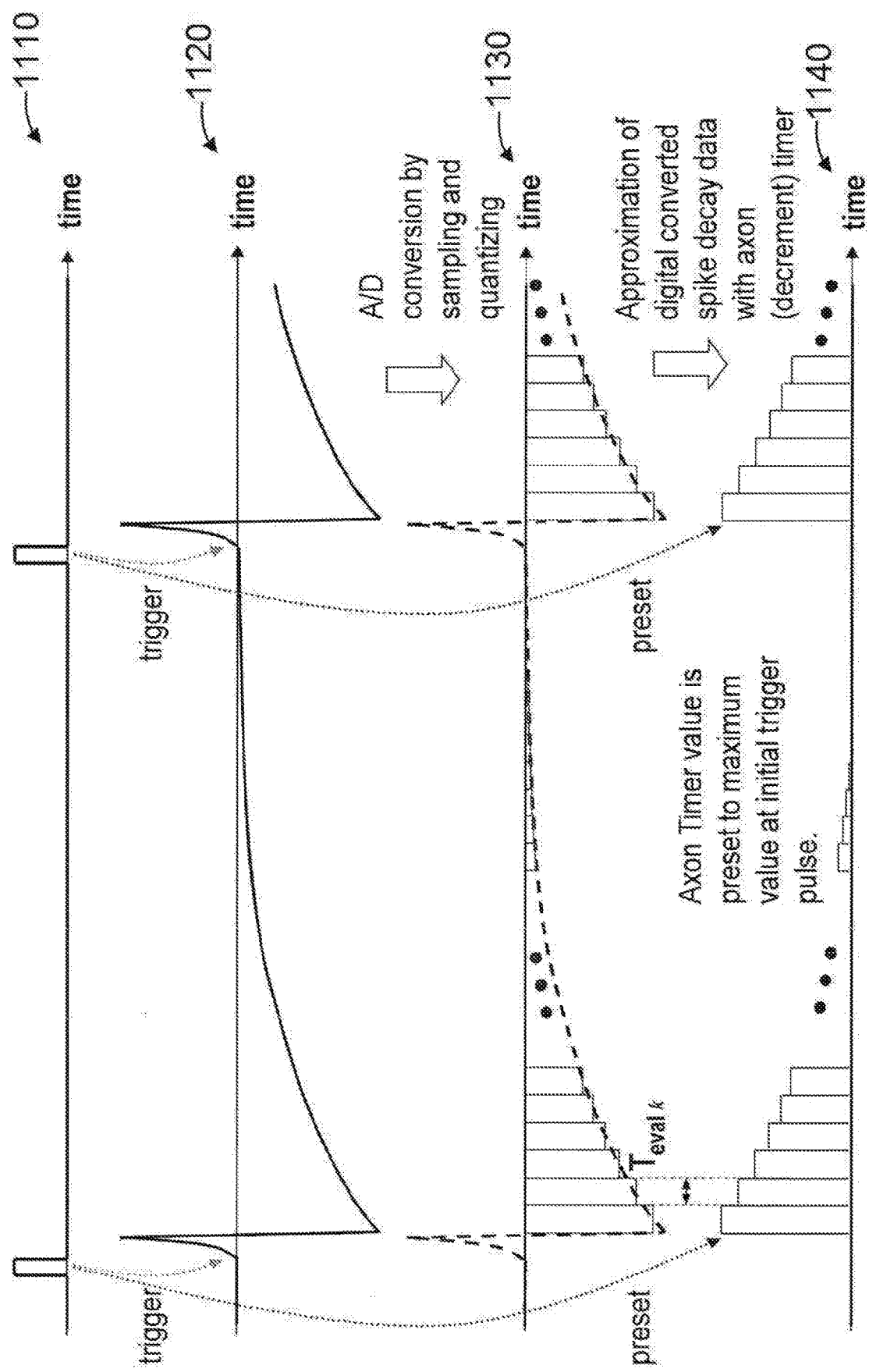
FIG. 11 shows waveforms for several signals used to implement the present principles, in accordance with an embodiment of the present principles.

Referring to FIG. 11, waveforms for several signals used to implement the present principles are shown, in accordance with an embodiment of the present principles.

A spike trigger signal 1110 is supplied as a square wave pulse, in accordance with the present principles. A virtual analog spike 1120 is input to the system from an axon. The virtual analog spike 1120 is triggered using the spike trigger signal 1110. The virtual analog spike 1120 is based on an STDP model and it affects a neuron cell body through a connected synapse in order to update NP values. As the shape of this waveform is fixed, it can be converted with a fixed set of digital data 1130. Further, the effect of the spike input is implemented with the AT and DT, with approximation. The AT's and DT's behavior is denoted by the reference varying values shown with the height of the bars 1140. The individual ATs and DTs are prepared for all axons and dendrites and they operate independently.

The individual $AT_i$ (for i=0 to 255) and $DT_j$ (for j=0 to 255) are prepared for individual $axon_i$ (for i=0 to 255) and individual $dendrite_j$ (for j=0 to 255), respectively. Individual $AT_i$ and $DT_j$ (for i, j=0 to 255) operate independently because update and reset/preset timing for them are independent. When a spike trigger signal is supplied to a certain $axon_i$ (or dendrite), the corresponding $AT_i$ (or $DT_j$) value is preset to a certain maximum value. While no spike trigger signal is supplied to the $axon_i$ (or dendrite), however, the corresponding $AT_i$ (or $DT_j$) value decreases by certain amount at every evaluation time cycle. When there is no spike trigger signal for longer than a certain duration of time, the corresponding $AT_i$ (or $DT_j$) value decreases until it is equal to zero, and the $AT_i$ (or $DT_j$) value stays at zero. As explained before, the $AT_i$ and $DT_j$ values are preset to their initial values when corresponding axon input ($ax\_in_i$) or dendrite output ($dr\_out_j$) signals are given or generated during their evaluation time cycle. In a neuromorphic system, axon input signals $ax\_in_i$ (for i=0 to 255) are supplied from outside or from pre-neurons as system input signals. These signals trigger virtual analog spikes, which are supplied to the axon of the synapse. The system output signals $dr\_out_j$ (for j=0 to 255) are generated as the fire signals of the neurons (or post neurons). The latter signals trigger virtual analog spikes, which are also supplied to the dendrite of the synapse. Because these analog signals cannot be processed in digital circuits, digital approximation is performed by using $AT_i$ and $DT_j$ values for calculation in the NPU 425, SWI 430 and SWD 435. The SWI 430 and SWD 435 are activated in the learning mode only. The SWI 430, SWD 435 and SAG 455 update SW with the following sequence.

Figure 12:
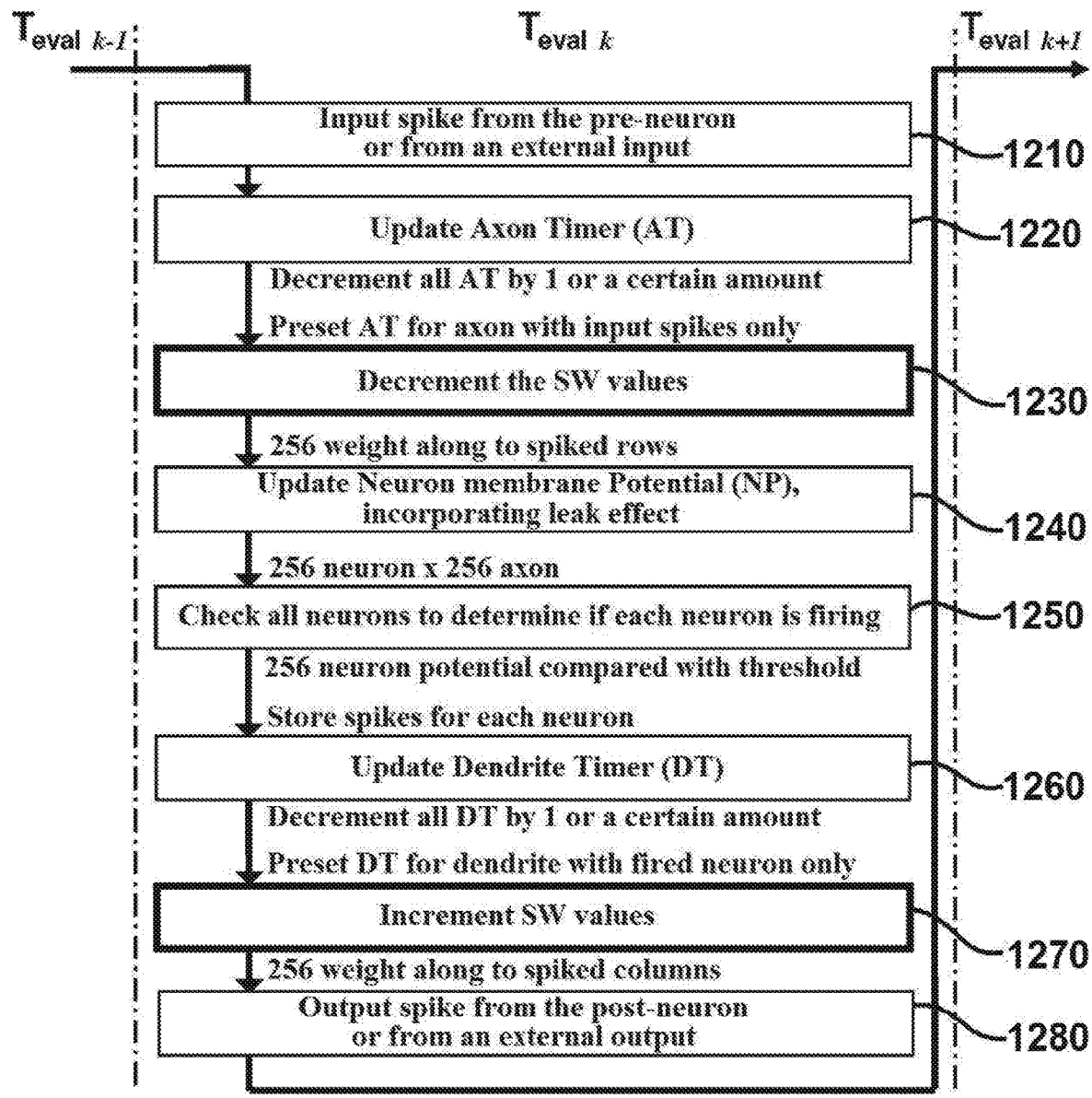
FIG. 12 shows a detailed operation flow in one (k-th) evaluation cycle ($T_{eval\_k}$) used to implement the present principles, in accordance with an embodiment of the present principles.

Referring now to FIG. 12, a sequence for the operation of the system is shown. In this figure, evaluation time cycles $T_{eval\ k-1}$, $T_{eval\ k}$ and $T_{eval\ k+1}$ are shown. The timing sequence for $T_{eval\ k}$, which is described in detail, is repeated, so the other evaluation time cycles, such as $T_{eval\ k-1}$ and $T_{eval\ k+1}$, have completely the same sequences. At $T_{eval\ k}$, the sequence progresses from top to bottom. The sequence begins at step 1210.

At step 1210, a spike is input from the pre-neuron or from an external input and is supplied to the AT 410, SWD 435 and SAG 455.

At step 1220, the AT is updated, during which all AT values are decremented by 1 or a certain amount and the AT is preset for axons with input spikes only. In one embodiment of the present principles, the amount by which the AT values are decremented is determined using the time decay shapes in 1140 of FIG. 11. If there is a spike axon (or ax_in$_i$) at step 1210, the corresponding AT value (or AT$_i$) is preset to the initial maximum value, which is determined as the timer preset value. For example, if the AT's value is determined to have 4 bits, the preset value is 15 ('1111' in binary). In this embodiment the AT value is updated only at step 1220.

At step 1230, the SWD 435 decrements the SW values. In one embodiment of the present principles, SW$_{ij}$ values are updated (decremented) with the current DT$_j$ values and the SW$_{ij}$ values only when spike input is given at ax_in$_i$. In one embodiment of the present principles, the decrement amount is determined using the DT and SW values updated at step 1260 and step 1270 in T$_{eval\ k-1}$ cycle, respectively.

At step 1240, the NP is updated while incorporating the leak effect. During this step, the NPU receives input signals for the AT values updated at step 1220, the SW values updated at the step 1230 and the current NP values. The NPU then applies the leaky decay effect and generates the output data for the next NP value.

At step 1250, all of the neurons are checked in order to determine whether each of the neurons fires or not. In an embodiment of the present principles, the NPU checks whether the NP reaches a certain threshold level (fire_th<0: 7>) to generate a fire signal. The result of this check is shown with output signals dr_out$_j$ (for j=0 to 255). In one embodiment of the present principles, NP$_j$ values are updated with the AT$_i$ values updated at step 1220, the fixed SW$_{ij}$ values updated at the step 1230, and current NP$_j$ values, considering the leak decay effect. In one embodiment, this update occurs even when there is no spike input at ax_in$_i$ or no spike output at dr_out$_j$.

At step 1260, the DT is updated, during which all DT times are decremented by 1 or a certain amount and the DT is preset for dendrites with fired neurons only. In one embodiment of the present principles, the amount by which the DT values are decremented is determined using the time decay shapes in 1140 of FIG. 11. If there is a neuron fire signal input at the dendrite (or dr_out$_j$) at step 1250, the corresponding DT value (or DT$_j$) is preset to the initial maximum value, which is determined as the timer preset value. For example, if the DT's value is determined to have 4 bits, the preset value is 15 ('1111' in binary). In this embodiment the DT value is updated only at step 1260.

At step 1270, the SWI 430 increments the SW values. In one embodiment of the present principles, SW$_{ij}$ values are updated (incremented) with the AT$_i$ values and the SW$_{ij}$ values only when spike output is generated at dr_out$_j$. In one embodiment of the present principles, the increment amount is determined using the AT and SW values updated at step 1220 and step 1230 in T$_{eval\ k}$ cycle, respectively.

In one embodiment, there is only one 8-bit write port for SW RAM 405. The sw_inc_dec_sel signal selects an updated (incremented) SW value, sw_inc(t+1)<0:7>, or an updated (decremented) SW value, sw_dec(t+1)<0:7>, to be written into the SW RAM 405. If the system is on step 1230, the sw_inc_dec_sel signal is Low. If the system is on step 1270, the sw_inc_dec_sel signal is High.

At step 1280, a spike is output from the post-neuron and is supplied to the DT 415, SWI 430, SAG 455 and an external output.

In one embodiment of the present principles, in steps 1230 and 1270, SW$_{ij}$ is updated in the manner of the STDP rules.

Figure 13:
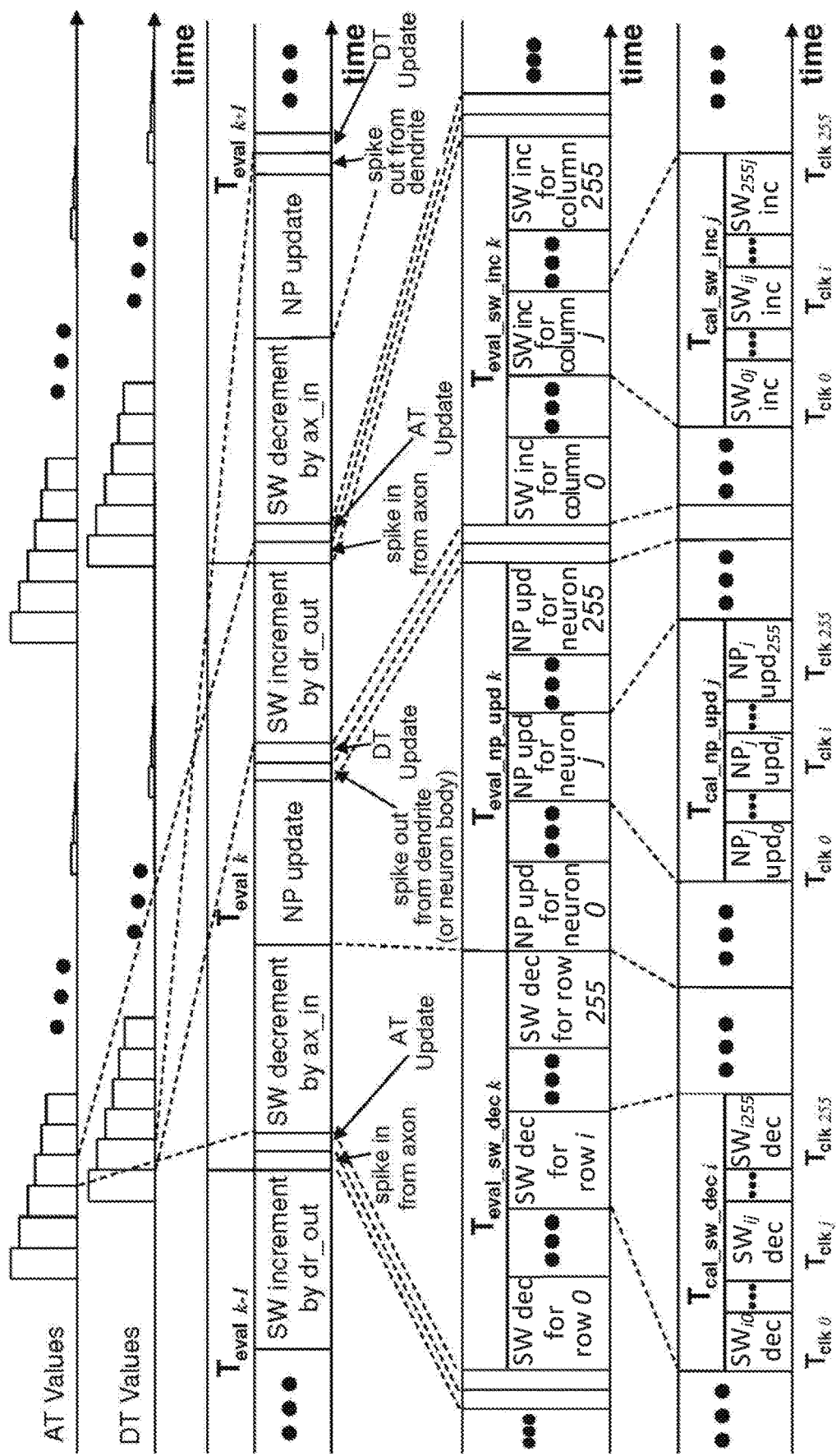
FIG. 13 shows a hierarchy of a cycle time used to implement the present principles, in accordance with an embodiment of the present principles.

According to the present principles, there are several different kinds of cycle times used to update SW and NP. These cycle times have a hierarchy. Referring now to FIG. 13, the hierarchy of the cycle times is shown, in accordance with the present principles. With this timing cycle, SW and NP are updated correctly without any update conflict.

The following definitions apply regarding at least FIG. 13.

T$_{eval\ k}$: k-th evaluation cycle which includes update cycles for the NP, SW, AT, DT values as well as spike input and output and neuron status check cycles.

T$_{eval\_np\_upd\ k}$: NP update cycle for all neurons, included in T$_{eval\ k}$ cycle.

T$_{eval\_sw\_dec\ k}$: SW decrement cycle for target synapses in T$_{eval\ k}$ cycle.

T$_{eval\_sw\_inc\ k}$: SW increment cycle for target synapses in T$_{eval\ k}$ cycle.

T$_{cal\_np\_upd\ j}$: NP$_j$ update cycle for neuron j.

T$_{cal\_sw\_dec\ i}$: SW$_{ij}$ decrement cycle in row i (for j=0 to 255).

T$_{cal\_sw\_inc\ j}$: SW$_{ij}$ increment cycle in column j (for i=0 to 255). ⇒

T$_{clk\ i\ or\ j}$: NP$_j$ upd$_i$⇒NP$_j$ update partial cycle with SW$_{ij}$ and AT$_i$ SW$_{ij}$ dec⇒SW$_{ij}$ decrement cycle with DT$_j$ and SW$_{ij}$ SW$_{ij}$ inc⇒SW$_{ij}$ increment cycle with AT$_i$ and SW$_{ij}$ The AT$_i$, DT$_j$, NP$_j$ and SW$_{ij}$ are updated every T$_{eval\ k}$ cycle. There are one T$_{eval\_sw\_dec\ k}$ cycle, one T$_{eval\_np\_upd\ k}$ cycle, and one T$_{eval\_sw\_inc\ k}$ cycle in one T$_{eval\ k}$ cycle. The T$_{eval\_sw\_dec\ k}$ cycle, T$_{eval\_np\_upd\ k}$ cycle, and T$_{eval\_sw\_inc\ k}$ cycle correspond to steps 1230, 1240, and 1270 of FIG. 12, respectively.

For the NP$_j$ update, the procedure completed in one T$_{eval\_np\_upd\ k}$ cycle is always (regardless of axon or dendrite spike existence) triggered once in one T$_{eval\ k}$ cycle. There are a total of 256 (total number of neurons) T$_{cal\_np\_upd\ j}$ (for j=0 to 255) cycles in one T$_{eval\_np\_upd\ k}$ cycle. The T$_{cal\_np\_upd\ j}$ (j=0 to 255) cycles correspond to update cycles for NP of neuron$_j$(NP$_j$) (j=0 to 255), respectively. Furthermore, there are a total of 256 T$_{clk\ i\ j}$ (for i=0 to 255) cycles in one T$_{cal\_np\_upd\ j}$ cycle. Those correspond to NP$_j$ upd$_i$ (for i=0 to 255) cycles. The one NP$_j$ upd$_i$ corresponds to a certain intermediate NP$_j$ updated value with AT$_i$, SW$_{ij}$ and NP$_j$ at that period.

For the SW$_{ij}$ decrement update, the procedure is triggered only when the axon input spikes are supplied. If there is at least one ax_in$_i$ (for i=0 to 255) with spike input, the procedure goes into T$_{eval\_sw\_dec\ k}$ cycle. Although there are a total of 256 (total number of synapse rows in a crossbar array) T$_{cal\_sw\_dec\ i}$ (for i=0 to 255) cycles in one T$_{eval\_sw\_dec\ k}$ cycle, only the T$_{cal\_sw\_dec\ i}$ cycles which correspond to ax_in$_i$ with spike input are processed (cycles for other rows are skipped). Furthermore, there are a total of 256 T$_{clk\ j}$ (for j=0 to 255) cycles in each T$_{cal\_sw\_dec\ i}$ cycle. Those correspond to SW$_{ij}$ dec (for j=0 to 255) cycles. The one SW$_{ij}$ dec corresponds to the cycle for SW$_{ij}$ decrement update with DT$_j$ and SW$_{ij}$ at that period.

For the SW$_{ij}$ increment update, the procedure is triggered only when the dendrite output spikes are generated. If there is at least one dr_out$_j$(for j=0 to 255) with spike output, the procedure goes into T$_{eval\_sw\_inc\ k}$ cycle. Although there are a total of 256 (total number of synapse columns in a crossbar array) T$_{cal\_sw\_inc\ j}$ (for j=0 to 255) cycles in one T$_{eval\_sw\_inc\ k}$ cycle, only the T$_{cal\_sw\_inc\ j}$ cycles for columns j which correspond to dr_out$_j$ with spike output are processed (cycles for other columns are skipped). Furthermore, there are a total of 256 T$_{clk\ i}$ (for i=0 to 255) cycles in each T$_{cal\_sw\_inc\ j}$ cycle. Those correspond to SW$_{ij}$ inc (for i=0 to 255) cycles. The one SW$_{ij}$ inc corresponds to the cycle for SW$_{ij}$ increment update with AT$_i$ and SW$_{ij}$ at that period.

The calculation time cycles $T_{cal\_np\_upd\ j}$ (j=0 to 255) correspond to column level operations. That is, in the $T_{cal\_np\_upd\ j}$ cycle, the next $NP_j$ values for 256 neurons are calculated with all 256 $AT_i$ (for i=0 to 255), $SW_{ij}$ (for i=0 to 255), and current $NP_j$ values. These partial calculation cycles in the $T_{cal\_np\_upd\ j}$ cycle are defined as $NP_j$ $upd_i$ (=$T_{clk\ i}$) (for i=0 to 255) cycles.

The calculation time cycles $T_{cal\_sw\_dec\ i}$ (i=0 to 255) correspond to axon input row level operations. That is, in the $T_{cal\_sw\_dec\ i}$ cycle, next $SW_{ij}$ (for j=0 to 255) values for 256 synapses in the row i are calculated with all 256 $DT_j$ (for j=0 to 255) and 256 $SW_{ij}$ (for j=0 to 255). The sub-cycles which calculate $SW_{ij}$ (for j=0 to 255) are defined as $SW_{ij}$ dec (=$Tclk_j$) (for j=0 to 255) cycles. These SW decrement cycle and sub-cycles are triggered only when the axon input spikes for the corresponding rows are supplied.

The calculation time cycles $T_{cal\_sw\_inc\ j}$ (j=0 to 255) correspond to dendrite output column level operations. That is, in the $T_{cal\_sw\_inc\ j}$ cycle, next $SW_{ij}$ (for i=0 to 255) values for 256 synapses in the column j are calculated with all 256 $AT_i$ (for i=0 to 255) and 256 $SW_{ij}$ (for i=0 to 255). The sub-cycles which calculate $SW_{ij}$ (for i=0 to 255) are defined as $SW_{ij}$ inc (=$Tclk_i$) (for i=0 to 255) cycles. These SW increment cycle and sub-cycles are triggered only when the dendrite output spikes for the corresponding columns are generated.

$T_{clk\ j}$ (for j=0 to 255) cycles are time cycles used to decrement one "$SW_{ij}$" value for column j in row i. There are a total of 256 columns (the number of dendrites and the number of columns in SW RAM 405). Therefore, there are a total of 256 $T_{clk\ j}$ (for j=0 to 255) cycles included in each $T_{cal\_sw\_dec\ i}$ (for i=0 to 255) cycle.

$T_{clk\ i}$ (for i=0 to 255) cycles are time cycles used to calculate an "intermediate $NP_j$". There are a total of 256 rows (the number of axons and the number of row in SW RAM 405). Therefore, there are a total of 256 $T_{clk\ i}$ (for i=0 to 255) cycles included in each $T_{cal\_np\_upd\ j}$ (for j=0 to 255) cycle.

$T_{clk\ i}$ (for i=0 to 255) cycles are time cycles also used to increment one "$SW_{ij}$" value for row i in column j. There are a total of 256 rows (the number of axons and the number of rows in SW RAM 405). Therefore, there are total of 256 $T_{clk\ i}$ (for i=0 to 255) cycles included in each $T_{cal\_sw\_inc\ j}$ (for j=0 to 255) cycle.

Figure 14:
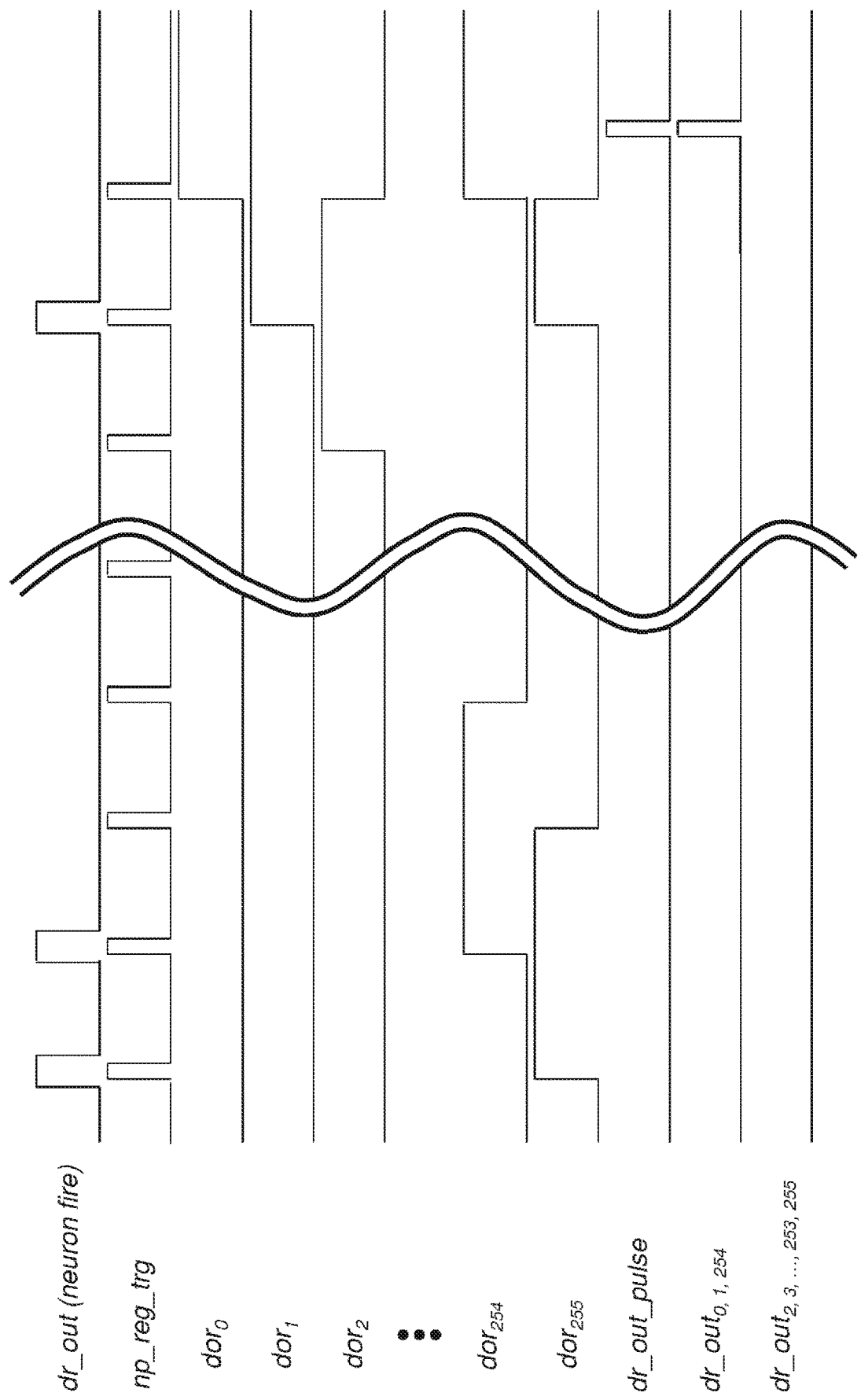
FIG. 14 shows a timing diagram showing timing of a serial to parallel conversion block for parallel output signal generation, in accordance with an embodiment of the present principles.

Referring to FIG. 14, a timing diagram of a serial to parallel conversion block for parallel output signal generation is shown, in accordance with an embodiment of the present principles. The timing diagram shows output signals of the DOR 450 ($dor_j$ for j=0 to 255) and reshaped dendrite output spike signals $dr\_out_j$ (for j=0 to 255), in accordance with an embodiment of the present principles. In one embodiment, the serial to parallel conversion of a neuron fire output signal of a post-neuron is applied to re-convert an internal serial signal back to an external parallel interface. The dr_out_pulse signal which is generated by the SAG 435 gives pulse shape for output spike signals $dr\_out_j$ (for j=0 to 255). The output signals of the DOR 450 $dor_j$ (for j=0 to 255) are gated with the dr_out_pulse signal to generate $dr\_out_j$ (for j=0 to 255), respectively.

Figure 15:
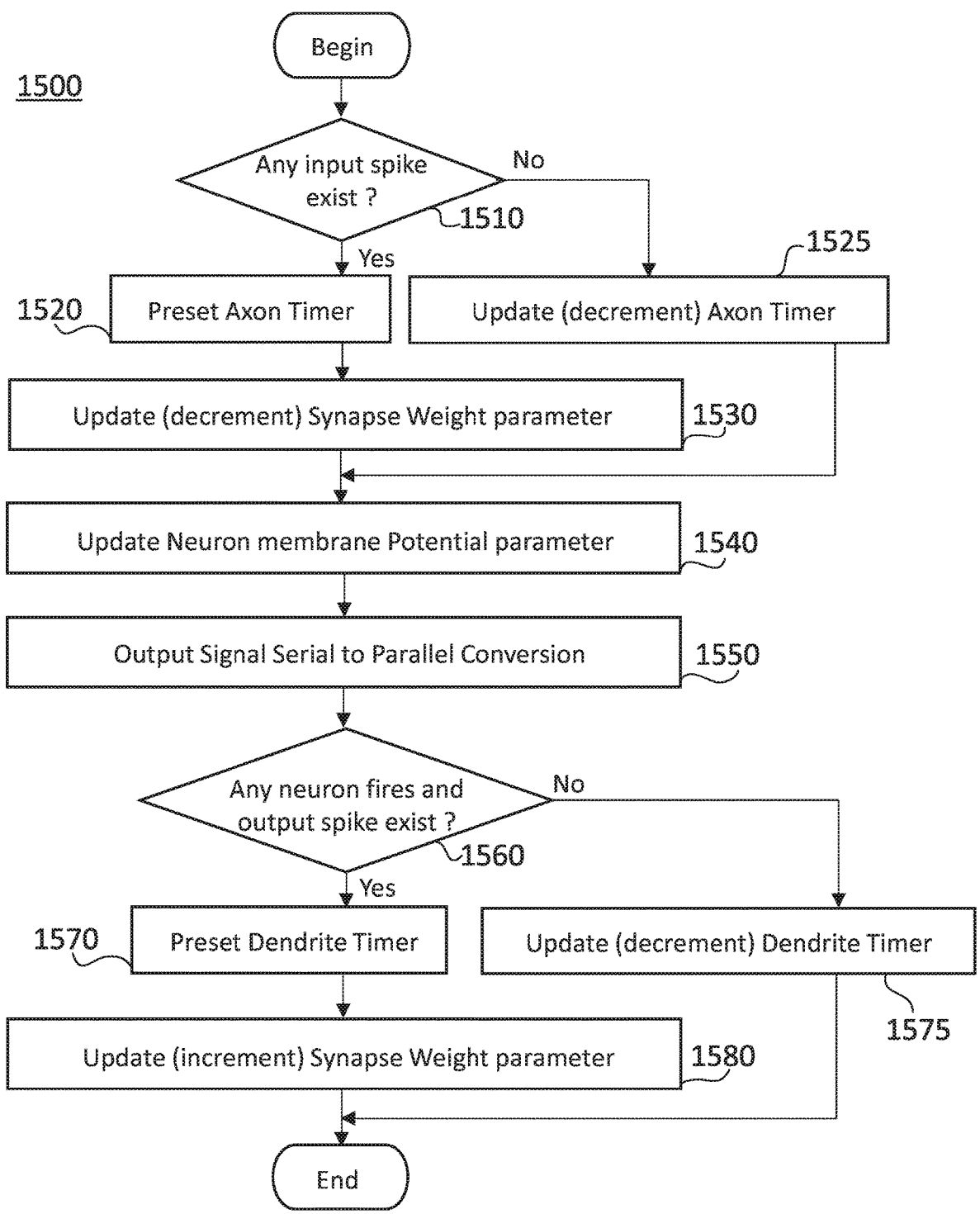
FIG. 15 depicts an operation flow of a method of operating a digital neuromorphic system, in accordance with an embodiment of the present principles.

Referring now to FIG. 15, a method 1500 for operating a digital neuromorphic system, in accordance with present principles, will now be described, wherein the method 1500 can be practiced through a hardware implementation.

In block 1510, system input is checked whether any spike exists or not.

In block 1520, in case any input spike exists, the corresponding digital AT value is preset to a certain value.

In block 1525, in case an input spike does not exist, the corresponding digital AT value is updated (decremented) by a certain amount.

In block 1530, in case any input spike exists, the SW parameter values of synapses for axon input spike are updated (decremented) according to the DT and current SW parameter values.

In block 1540, NP parameter values are updated according to the AT values, SW parameter values and current NP parameter values.

In block 1550, a serial to parallel conversion of post-neuron output signal is performed.

In block 1560, statuses of the neurons are checked whether they fire or not.

In block 1570, in case any neuron fires, the corresponding digital DT value is preset to a certain value.

In block 1575, in case a neuron does not fire, the corresponding digital DT value is updated (decremented) by a certain amount.

In block 1580, in case any neuron fires, the SW parameter values of synapses for fired neuron are updated (incremented) according to the AT and current SW parameter values.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for operating a neuromorphic system for generating neuron activity, comprising:
  generating time signals including multi-bit digital values using at least one digital timer for a plurality of parallel input signals, the time signals showing a time that has elapsed since a spike input was provided to at least one node of a synapse in a crossbar array of the neuromorphic system;

updating, by a serial process, parameters of the neuromorphic system using the time signals, the current values of the parameters, and hierarchical timing cycles that are based on the time signals for some of a plurality of independent serial steps for processing the plurality of parallel input signals, wherein the updated parameters of the neuromorphic system include synapse weight values and neuron membrane potential, wherein, for each of the parameters, the hierarchical timing cycles include timing cycles for sequentially updating values of the parameter based on either one of a row and column direction of the crossbar array;

presetting, using a processor, the digital values of the at least one digital timer to initial values when the spike input is provided to the node;

updating, by a further serial process, using the processor, the digital values of the at least one digital timer with a specified amount when there is an absence of a spike input to the node; and converting signals based on the serial process and the further serial process to parallel output signals.

2. The method according to claim 1, wherein the at least one digital timers emulate an analog waveform of a neuron spike based on converting the analog waveform into a fixed set of digital data.

3. The method according to claim 1, wherein the updating parameters of the neuromorphic system further comprises:
decrementing the synapse weight values; updating the neuron membrane potential; and
incrementing the synapse weight values,
wherein each step is performed separately and in sequence.

4. The method according to claim 3, wherein the steps of decrementing the synapse weight values, updating the neuron membrane potential, and incrementing the synapse weight values are performed in each of at least one evaluation time cycle that corresponds to each of the time signals generated by the digital timers.

5. The method of claim 4, wherein each of the at least one evaluation time cycle has a hierarchical timing configuration.

6. The method of claim 5, wherein each of the steps of decrementing synapse weight values, updating the neuron membrane potential, and incrementing the synapse weight values has its own respective sub-time cycle associated with every node of the synapse in the neuromorphic system.

7. The method of claim 3, further comprising making a serial to parallel conversion of a post-neuron output signal after the updating the neuron membrane potential and before the incrementing the synapse weight values.

8. A non-transitory computer-readable storage medium comprising a computer readable program for operating a neuromorphic system for generating neuron activity, wherein the computer readable program when executed on a computer causes the computer to perform the steps of:

generating time signals including multi-bit digital values using at least one digital timer for a plurality of parallel input signals, the time signals showing a time that has elapsed since a spike input was provided to at least one node of a synapse in a crossbar array of the neuromorphic system;

updating, by a serial process, parameters of the neuromorphic system using the time signals, the current values of the parameters, and hierarchical timing cycles that are based on the time signals for some of a plurality of independent serial steps for processing the plurality of parallel input signals, wherein the updated parameters of the neuromorphic system include synapse weight values and neuron membrane potential, wherein, for each of the parameters, the hierarchical timing cycles include timing cycles for sequentially updating values of the parameter based on either one of a row and column direction of the crossbar array;

presetting, using a processor, the digital values of the at least one digital timer to initial values when the spike input is provided to the node;

updating, by a further serial process, using the processor, the digital values of the at least one digital timer with a specified amount when there is an absence of a spike input to the node; and converting signals based on the serial process and the further serial process to parallel output signals.

9. The non-transitory computer readable storage medium according to claim 8, wherein the digital timers emulate an analog waveform of a neuron spike based on converting the analog waveform into a fixed set of digital data.

10. The non-transitory computer readable storage medium according to claim 8, wherein the computer-readable program when executed on the computer causes the computer to further perform the steps of:

decrementing the synapse weight values; updating the neuron membrane potential; and incrementing the synapse weight values,
wherein each step is performed separately and in sequence.

11. The non-transitory computer readable storage medium according to claim 10, wherein the steps of decrementing the synapse weight values, updating the neuron membrane potential, and incrementing the synapse weight values are performed in each of at least one evaluation time cycle that corresponds to each of the time signals generated by the digital timers.

12. The non-transitory computer readable storage medium according to claim 11, wherein each of the at least one evaluation time cycle has a hierarchical timing configuration.

13. The non-transitory computer readable storage medium according to claim 12, wherein each of the steps of decrementing synapse weight values, updating the neuron membrane potential, and incrementing the synapse weight values has its own respective sub-time cycle associated with every node of the synapse in the neuromorphic system.

14. The non-transitory computer readable storage medium according to claim 10, wherein the computer-readable program when executed on the computer causes the computer to further perform the step of:

making a serial to parallel conversion of a post-neuron output signal after the updating the neuron membrane potential and before the incrementing the synapse weight values.

15. A system for operating a neuromorphic system for generating neuron activity, comprising:

a memory;

at least one hardware-based one digital timer; and a hardware-based processor configured to:

generate time signals including multi-bit digital values using the at least one digital timer for a plurality of parallel input signals, the time signals showing a time that has elapsed since a spike input was provided to at least one node of a synapse in a crossbar array of the neuromorphic system;

update, by a serial process, in the memory, parameters of the neuromorphic system using the time signals, the current values of the parameters, and hierarchical timing cycles that are based on the time signals for some of a plurality of independent serial steps for processing the plurality of parallel input signals, wherein the updated parameters of the neuromorphic system include synapse weight values and neuron membrane potential, wherein, for each of the parameters, the hierarchical timing cycles include timing cycles for sequentially updating values of the parameter based on either one of a row and column direction of the crossbar array;

preset, the digital values of the digital timers to initial values when the spike input is provided to the node;

update, by a further serial process, the digital values of the digital timers with a specified amount when there is an absence of a spike input to the node;

emulate an analog waveform of a neuron spike with at least one digital timer based on converting the analog waveform into a fixed set of digital data; and convert signals based on the serial process and the further serial process to parallel output signals.

16. The system according to claim 15, wherein the hardware-based processor is further configured to perform the steps of:
   decrementing the synapse weight values; updating the neuron membrane potential; and
   incrementing the synapse weight values,
      wherein each step is performed separately and in sequence.

17. The system according to claim 16, wherein the steps of decrementing the synapse weight values, updating the neuron membrane potential, and incrementing the synapse weight values are performed in each of at least one evaluation time cycle that corresponds to each of the time signals generated by the digital timers.

18. The system of claim 17, wherein each of the at least one evaluation time cycle has a hierarchical timing configuration.

19. The system of claim 18, wherein each of the steps of decrementing synapse weight values, updating the neuron membrane potential, and incrementing the synapse weight values has its own respective sub-time cycle associated with every node of the synapse in the neuromorphic system.

20. The system of claim 16, wherein the hardware-based processor is further configured to make a serial to parallel conversion of a post-neuron output signal after the updating the neuron membrane potential step and before the incrementing the synapse weight values step.

* * * * *